(12) United States Patent
Shibata

(10) Patent No.: US 10,435,031 B2
(45) Date of Patent: Oct. 8, 2019

(54) VEHICLE CONTROL DEVICE

(71) Applicant: Panasonic Corporation, Osaka (JP)

(72) Inventor: Teppei Shibata, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 39 days.

(21) Appl. No.: 15/267,159

(22) Filed: Sep. 16, 2016

(65) Prior Publication Data

US 2017/0088144 A1 Mar. 30, 2017

(30) Foreign Application Priority Data

Sep. 25, 2015 (JP) ................................ 2015-188742

(51) Int. Cl.
| | |
|---|---|
| B60W 50/00 | (2006.01) |
| B60W 50/08 | (2012.01) |
| B60W 10/20 | (2006.01) |
| B60W 50/14 | (2012.01) |
| G05D 1/02 | (2006.01) |
| G08G 1/16 | (2006.01) |
| G05D 1/00 | (2006.01) |
| G08G 1/0967 | (2006.01) |

(52) U.S. Cl.
CPC .......... *B60W 50/082* (2013.01); *B60W 10/20* (2013.01); *B60W 50/14* (2013.01); *G05D 1/0061* (2013.01); *G05D 1/0278* (2013.01); *G08G 1/096716* (2013.01); *G08G 1/096725* (2013.01); *G08G 1/096758* (2013.01); *G08G 1/096783* (2013.01); *G08G 1/16* (2013.01); *G08G 1/163* (2013.01); *G08G 1/167* (2013.01); *B60W 2420/42* (2013.01); *B60W 2420/52* (2013.01); *B60W 2750/40* (2013.01); *G05D 2201/0213* (2013.01)

(58) Field of Classification Search
USPC ......................................................... 701/41
See application file for complete search history.

(56) References Cited

U.S. PATENT DOCUMENTS

| | | | | |
|---|---|---|---|---|
| 6,285,931 B1 * | 9/2001 | Hattori | ................... | G07C 5/008 |
| | | | | 340/426.15 |
| 7,783,426 B2 * | 8/2010 | Kato | ..................... | B60W 40/04 |
| | | | | 180/167 |
| 7,797,107 B2 * | 9/2010 | Shiller | .................. | B60R 21/013 |
| | | | | 180/168 |

(Continued)

FOREIGN PATENT DOCUMENTS

| | | |
|---|---|---|
| JP | 2011-131838 | 7/2011 |
| JP | 2015-044432 A | 3/2015 |

(Continued)

*Primary Examiner* — Jonathan L Sample
(74) *Attorney, Agent, or Firm* — Greenblum & Bernstein, P.L.C.

(57) ABSTRACT

A vehicle control device can be mounted in a vehicle. A receiver receives information from a wireless device mounted in another vehicle. A determiner determines whether or not to switch an automatic steering mode to a manual steering mode on the basis of the information received by the receiver. A notifier prompts a driver of the vehicle to switch the automatic steering mode to the manual steering mode in a case where the determiner determines to switch the automatic steering mode to the manual steering mode.

18 Claims, 14 Drawing Sheets

(56) References Cited

U.S. PATENT DOCUMENTS

| | | | | |
|---|---|---|---|---|
| 7,894,951 | B2* | 2/2011 | Norris | H04L 67/12 |
| | | | | 180/443 |
| 8,520,695 | B1* | 8/2013 | Rubin | G08G 9/02 |
| | | | | 370/445 |
| 8,521,352 | B1* | 8/2013 | Ferguson | G05D 1/0274 |
| | | | | 701/25 |
| 8,571,743 | B1* | 10/2013 | Cullinane | G05D 1/00 |
| | | | | 701/23 |
| 8,605,947 | B2* | 12/2013 | Zhang | G06K 9/00798 |
| | | | | 348/116 |
| 8,874,301 | B1* | 10/2014 | Rao | B60K 28/066 |
| | | | | 701/25 |
| 8,996,228 | B1* | 3/2015 | Ferguson | G01C 21/3461 |
| | | | | 701/28 |
| 9,505,133 | B2* | 11/2016 | Osaka | B25J 13/088 |
| 9,566,959 | B2* | 2/2017 | Breuer | B60T 7/22 |
| 9,646,428 | B1* | 5/2017 | Konrardy | H04W 4/90 |
| 9,656,606 | B1* | 5/2017 | Vose | B60Q 9/008 |
| 9,845,866 | B2* | 12/2017 | Drees | B60W 30/182 |
| 9,870,649 | B1* | 1/2018 | Fields | G08G 1/096791 |
| 9,908,534 | B2* | 3/2018 | Desnoyer | B60W 50/14 |
| 10,198,772 | B2* | 2/2019 | Parameshwaran | G06Q 40/08 |
| 2011/0190972 | A1* | 8/2011 | Timmons | G01C 21/34 |
| | | | | 701/31.4 |
| 2012/0083960 | A1* | 4/2012 | Zhu | G05D 1/0214 |
| | | | | 701/23 |
| 2012/0253580 | A1* | 10/2012 | Al-Mahnna | G01C 21/3602 |
| | | | | 701/23 |
| 2014/0156133 | A1* | 6/2014 | Cullinane | B60W 30/00 |
| | | | | 701/23 |
| 2014/0324266 | A1* | 10/2014 | Zhu | G01W 1/00 |
| | | | | 701/23 |
| 2014/0333468 | A1* | 11/2014 | Zhu | G01S 17/95 |
| | | | | 342/54 |
| 2015/0046038 | A1* | 2/2015 | Kawamata | B60W 30/09 |
| | | | | 701/41 |
| 2015/0268665 | A1* | 9/2015 | Ludwick | B60Q 5/008 |
| | | | | 701/23 |
| 2015/0274072 | A1* | 10/2015 | Croteau | E21F 11/00 |
| | | | | 340/903 |
| 2015/0343947 | A1* | 12/2015 | Bernico | B60Q 9/00 |
| | | | | 340/436 |
| 2015/0353088 | A1* | 12/2015 | Ishikawa | G05D 1/0061 |
| | | | | 701/23 |
| 2015/0367848 | A1* | 12/2015 | Terashima | B60W 30/182 |
| | | | | 701/25 |
| 2016/0179092 | A1* | 6/2016 | Park | G05D 1/0061 |
| | | | | 701/23 |
| 2016/0280234 | A1* | 9/2016 | Reilhac | B60K 35/00 |

FOREIGN PATENT DOCUMENTS

| | | |
|---|---|---|
| JP | 2015-141476 A | 8/2015 |
| WO | 2015/014894 A2 | 2/2015 |

* cited by examiner

VEHICLE CONTROL DEVICE

BACKGROUND

1. Technical Field

The present disclosure relates to a vehicle control technique. More specifically, the present disclosure relates to a vehicle control device that determines whether or not to switch an automatic steering mode to a manual steering mode.

2. Description of the Related Art

A vehicle that is running in an automatic steering mode switches from the automatic steering mode to a manual steering mode by handing over authority to operate the vehicle to a driver in a case where it is determined that it is difficult to continue the automatic steering mode (see, for example, Japanese Unexamined Patent Application Publication No. 2011-131838).

SUMMARY

In one general aspect, the techniques disclosed here feature a vehicle control device that is capable of being mounted in a vehicle, including: a receiver that receives information from a wireless device mounted in another vehicle; a determiner that determines whether or not to switch an automatic steering mode to a manual steering mode on basis of the information received by the receiver; and a notifier that prompts a driver of the vehicle to switch the automatic steering mode to the manual steering mode in a case where the determiner determines to switch the automatic steering mode to the manual steering mode.

According to the present disclosure, the automatic steering mode can be smoothly switched to the manual steering mode.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
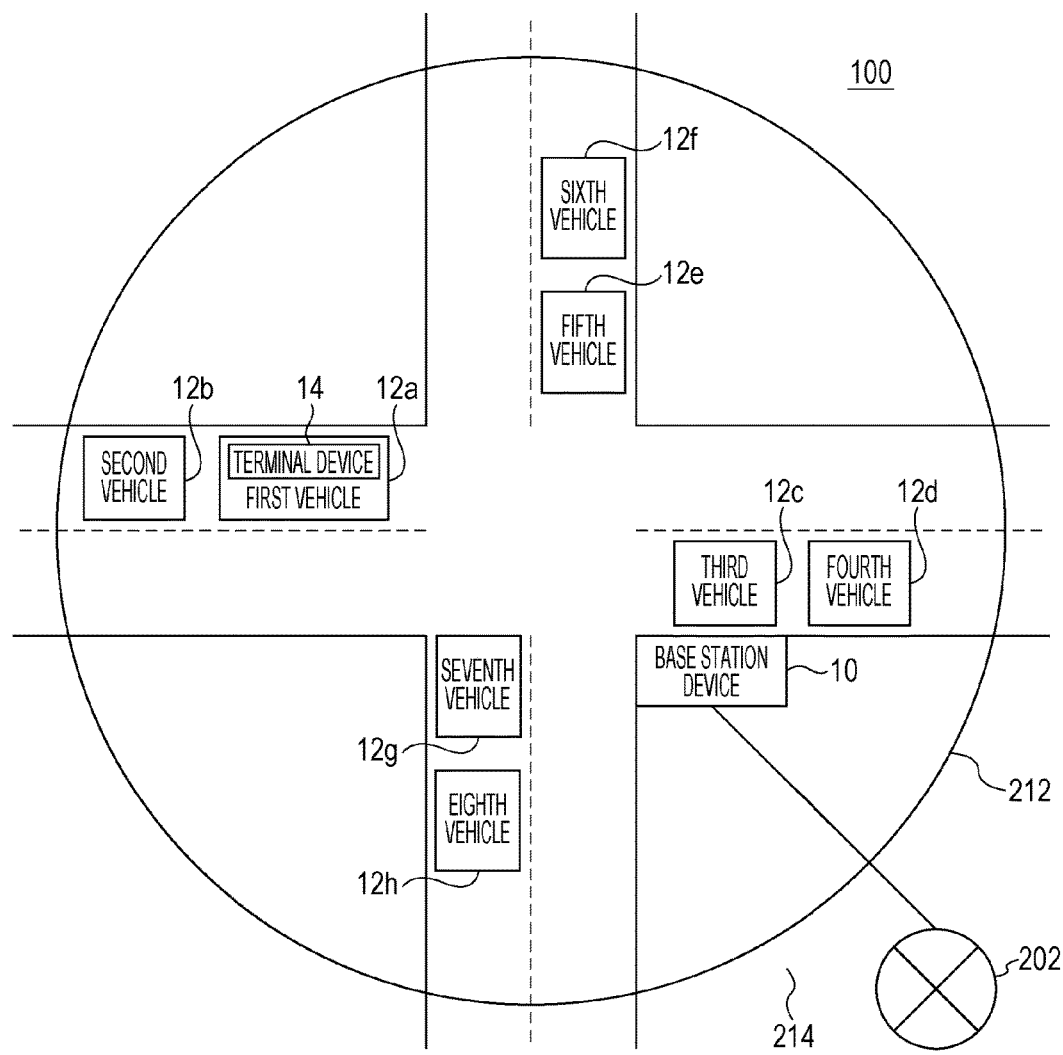
FIG. 1 is a diagram illustrating a configuration of a communication system according to Embodiment 1 of the present disclosure.

Underlying Knowledge Forming Basis of the Present Disclosure

In a case where an automatic steering mode is executed only on the basis of a result of detection of an autonomous sensor provided in a vehicle, an area used to determine whether or not to continue the automatic steering mode is limited to an area that can be detected by the autonomous sensor. The autonomous sensor is, for example, a camera or a millimeter-wave radar. In general, the area that can be detected by the autonomous sensor is approximately several tens of meters. Accordingly, a period from a time when it is determined that continuation of the automatic steering mode is difficult to a time when the automatic steering mode should be switched to a manual steering mode is short. In view of this, it is desired that switching from the automatic steering mode to the manual steering mode be smoothly executed.

The present disclosure was accomplished in view of such a circumstance and provides a technique for smoothly switching the automatic steering mode to the manual steering mode.

Embodiment 1

An outline of the present disclosure is described below before the present disclosure is specifically described. Embodiment 1 of the present disclosure relates to a vehicle control device mounted in a vehicle that is capable of switching between an automatic steering mode and a manual steering mode. The vehicle control device proposes switching from the automatic steering mode to the manual steering mode to a driver of the vehicle in a case where it is determined that continuation of the automatic steering mode is difficult. In a case where the driver agrees with the proposal, the vehicle control device switches the automatic steering mode to the manual steering mode. Conventionally, whether or not continuation of the automatic steering mode is difficult is determined on the basis of a result of detection by an autonomous sensor. The autonomous sensor is, for example, a camera or a millimeter-wave radar. However, since a detection range of the autonomous sensor is short (approximately several tens of meters), a driver of the vehicle is required to hastily execute the switching. In order to execute smooth switching, the vehicle control device according to the present embodiment performs the determining process on the basis of information acquired in a communication system such as ITS (Intelligent Transport Systems).

The ITS are communication systems in which inter-vehicle communication is performed between terminal devices mounted in vehicles and roadside-to-vehicle communication from a base station device provided at an intersection or the like to a terminal device is performed. The communication systems use wireless LAN (Local Area Network) complying with a standard such as IEEE802.11 and an access control function called CSMA/CA (Carrier Sense Multiple Access with Collision Avoidance). Accordingly, the same wireless channel is shared by a plurality of terminal devices. In the ITS, it is necessary to transmit information to a large indefinite number of terminal device. In order to efficiently execute such transmission, the present communication system broadcasts a packet signal.

That is, a terminal device broadcasts, as inter-vehicle communication, a packet signal in which information such as the speed or position of a vehicle is stored. Another terminal device receives the packet signal and recognizes the approach or the like of the vehicle on the basis of the information. In order to reduce interference between roadside-to-vehicle communication and inter-vehicle communication, a base station device repeatedly defines a frame including a plurality of sub-frames. The base station device selects, for roadside-to-vehicle communication, any of the plurality of sub-frames, and broadcasts a packet signal in which control information and the like are stored during a period corresponding to the start portion of the selected sub-frame.

The control information includes information concerning a period (hereinafter referred to as a "roadside-to-vehicle communication period") for broadcast transmission of the packet signal by the base station device. A terminal device specifies a roadside-to-vehicle communication period on the basis of the control information and then broadcasts a packet signal by the CSMA method during a period (hereinafter referred to as an "inter-vehicle communication period") other than the roadside-to-vehicle communication period. As a result, the roadside-to-vehicle communication and the inter-vehicle communication are time-division multiplexed. Note that a terminal device that cannot receive the control information from the base station device, i.e., a terminal device that is out of an area formed by the base station device transmits a packet signal by the CSMA method irrespective of the configuration of the frame. In such a communication system, a distance of transmission of a packet signal is longer than a distance of detection by an autonomous sensor, and therefore a timing of determination can be made earlier.

A vehicle control device according to the present embodiment is described after a communication system used in the vehicle control device is described. FIG. 1 is a diagram illustrating a configuration of a communication system 100 according to Embodiment 1 of the present disclosure. This corresponds to a case where an intersection is viewed from above. The communication system 100 includes a base station device 10; a first vehicle 12a, a second vehicle 12b, a third vehicle 12c, a fourth vehicle 12d, a fifth vehicle 12e, a sixth vehicle 12f, a seventh vehicle 12g, and an eighth vehicle 12h, which are collectively referred to as vehicles 12; and a network 202. In FIG. 1, only a terminal device 14 mounted in the first vehicle 12a is illustrated, but a terminal device 14 is mounted in each of the vehicles 12. Furthermore, an area 212 is formed around the base station device 10, and an outside area 214 is formed outside the area 212.

As illustrated in FIG. 1, a road extending in a horizontal direction, i.e., a left-right direction of FIG. 1 crosses, at a central part, a road extending in a vertical direction, i.e., an top-bottom direction of FIG. 1. In FIG. 1, the top side corresponds to "north", the left side corresponds to "west", the bottom side corresponds to "south", and the right side corresponds to "east". A part at which these two roads cross each other is an "intersection". The first vehicle 12a and the second vehicle 12b are traveling from left to right, and the third vehicle 12c and the fourth vehicle 12d are traveling from right to left. The fifth vehicle 12e and the sixth vehicle 12f are traveling from top to bottom, and the seventh vehicle 12g and the eighth vehicle 12h are traveling from bottom to top.

In the communication system 100, the base station device 10 is fixedly installed at the intersection. The base station device 10 controls communication between the terminal devices. The base station device 10 repeatedly generates a frame including a plurality of sub-frames on the basis of a signal received from a GPS (Global Positioning System) satellite (not illustrated) or a frame formed by another base station device 10 (not illustrated). It is specified that a roadside-to-vehicle communication period can be set at the start of each of the sub-frames.

The base station device 10 selects a sub-frame in which no roadside-to-vehicle communication period is set by another base station device 10 from among the plurality of sub-frames included in the frame. The base station device 10 sets a roadside-to-vehicle communication period at the start of the selected sub-frame. The base station device 10 broadcasts a packet signal during the set roadside-to-vehicle communication period. A plurality of packet signals may be broadcast during the roadside-to-vehicle communication period. The packet signal includes, for example, accident information, traffic jam information, and traffic signal information. Note that the packet signal also includes information concerning a timing at which the roadside-to-vehicle communication period is set and control information concerning the frame.

The terminal device 14 is mounted in each of the vehicles 12 as described above and can therefore be transported. Upon receipt of the packet signal from the base station device 10, the terminal device 14 estimates that the terminal device 14 is within the area 212. In a case where the terminal device 14 is within the area 212, the terminal device 14 generates a frame on the basis of control information included in the packet signal, especially information concerning a timing at which the roadside-to-vehicle communication period is set and information concerning the frame. As a result, the frame generated in each of the plurality of terminal devices 14 is in synchronization with the frame generated in the base station device 10. The terminal device 14 broadcasts a packet signal during an inter-vehicle communication period that is different from the roadside-to-vehicle communication period. During the inter-vehicle communication period, CSMA/CA is performed. Meanwhile, in a case where the terminal device 14 estimates that the terminal device 14 is within the outside area 214, the terminal device 14 broadcasts a packet signal by performing CSMA/CA irrespective of the configuration of the frame. The terminal device 14 recognizes an approach or the like of a vehicle 12 in which another terminal device 14 is mounted on the basis of a packet signal from the other terminal device 14. Details of the recognition will be described later.

Figure 2:
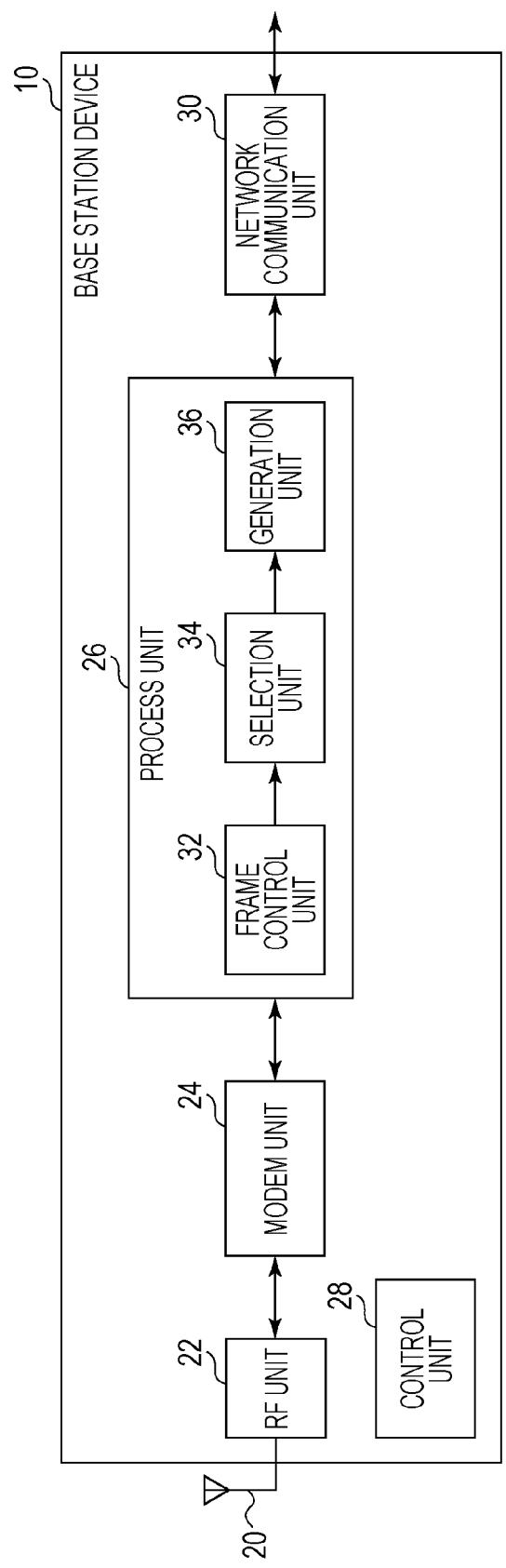
FIG. 2 is a diagram illustrating a configuration of a base station device of FIG. 1.

FIG. 2 illustrates a configuration of the base station device 10. The base station device 10 includes an antenna 20, an RF unit 22, a modem unit 24, a process unit 26, a control unit 28, and a network communication unit 30. The process unit 26 includes a frame control unit 32, a selection unit 34, and a generation unit 36.

The RF unit 22 receives, as a receiving process, a packet signal from a terminal device 14 or another base station device 10 (not illustrated) via the antenna 20. The RF unit 22 converts the frequency of the received wireless frequency packet signal to generate a baseband packet signal. Furthermore, the RF unit 22 supplies the baseband packet signal to the modem unit 24. In general, the baseband packet signal is made up of an in-phase component and an orthogonal component, and therefore two signal lines should be illustrated. However, for clarity in FIG. 2, only one signal line is illustrated. The RF unit 22 includes an LNA (Low Noise Amplifier), a mixer, an AGC, and an A/D converter unit.

The RF unit 22 converts, as a transmitting process, the frequency of the baseband packet signal supplied from the modem unit 24 to generate a wireless frequency packet signal. Furthermore, the RF unit 22 transmits the wireless frequency packet signal via the antenna 20 during the roadside-to-vehicle communication period. The RF unit 22 includes a PA (Power Amplifier), a mixer, and a D/A converter unit.

The modem unit 24 demodulates, as a receiving process, the baseband packet signal from the RF unit 22. Furthermore, the modem unit 24 supplies a demodulation result to the process unit 26. Moreover, the modem unit 24 modulates, as a transmitting process, data from the process unit 26. Furthermore, the modem unit 24 supplies, as a baseband packet signal, a modulation result to the RF unit 22. Since the communication system 100 supports an OFDM (Orthogonal Frequency Division Multiplexing) modulation method, the modem unit 24 also performs, as a receiving process, FFT (Fast Fourier Transform) and performs, as a transmitting process, IFFT (Inverse Fast Fourier Transform).

The frame control unit 32 receives a signal from a GPS satellite (not illustrated) and acquires time information on the basis of the received signal. Note that acquisition of the time information can be performed by using a known art, and description thereof is omitted. The frame control unit 32 generates a plurality of frames on the basis of the time information. For example, the frame control unit 32 generates 10 frames of "100 msec" by dividing a period of "1 sec" into 10 sections on the basis of a timing indicated in the time information. By repeating such a process, a frame is repeatedly defined. Note that the frame control unit 32 may detect control information from the demodulation result and generate a frame on the basis of the detected control information. Such a process corresponds to generating a frame that is in synchronization with a timing of a frame generated by another base station device 10.

Figure 3:
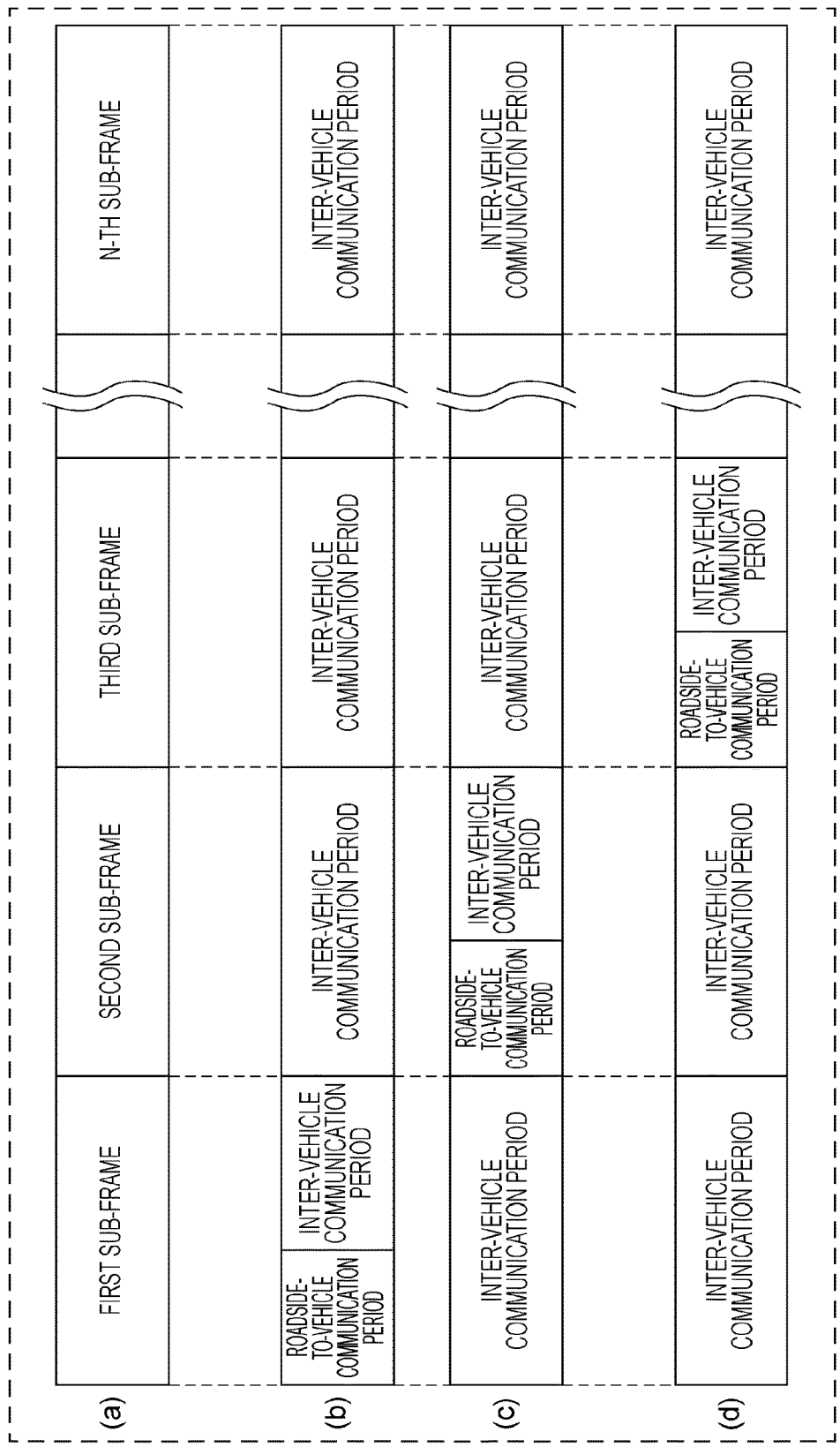
FIG. 3 is a diagram illustrating a format of a frame defined in the communication system of FIG. 1.

FIG. 3 illustrates a format of a frame defined in the communication system 100. FIG. 3(a) illustrates a configuration of the frame. The frame is made up of N sub-frames, i.e., the first through N-th sub-frames. That is, it can be said that the frame is formed by time-multiplexing a plurality of sub-frames that can be used for broadcast of a packet signal by the terminal device 14. For example, in a case where the length of the frame is 100 msec and where N is 8, sub-frames each having a length of 12.5 msec are defined. N may be a number other than 8. FIGS. 3(b) through 3(d) are described later. See FIG. 2 again.

The selection unit 34 selects a sub-frame in which a roadside-to-vehicle communication period should be set from among the plurality of sub-frames included in the frame. Specifically, the selection unit 34 accepts the frame defined by the frame control unit 32. Furthermore, the selection unit 34 accepts an instruction concerning the selected sub-frame via an interface (not illustrated). The selection unit 34 selects a sub-frame corresponding to the instruction. Separately from this, the selection unit 34 may automatically select a sub-frame. In this case, the selection unit 34 receives a demodulation result from another base station device 10 or a terminal device 14 (not illustrated) via the RF unit 22 and the modem unit 24. The selection unit 34 extracts the demodulation result received from the other base station device 10. The selection unit 34 specifies a sub-frame for which the demodulation result has not been accepted by specifying a sub-frame for which the demodulation result has been accepted.

This corresponds to specifying a sub-frame in which a roadside-to-vehicle communication period has not been set by another base station device 10, i.e., an unused sub-frame. In a case where there are a plurality of unused sub-frames, the selection unit 34 randomly selects one sub-frame. In a case where there is no unused sub-frame, i.e., in a case where each of the plurality of sub-frames is being used, the selection unit 34 acquires reception electric power corresponding to the demodulation result and preferentially selects a sub-frame of small reception electric power.

FIG. 3(b) illustrates a configuration of a frame generated by a first base station device 10a (not illustrated). The first base station device 10a sets a roadside-to-vehicle communication period at the start of a first sub-frame. Furthermore, the first base station device 10a sets an inter-vehicle communication period in a period of the first sub-frame excluding a roadside-to-vehicle communication period and in the second to N-th sub-frames. The inter-vehicle communication period is a period in which the terminal device 14 can broadcast a packet signal. That is, it is specified that the first base station device 10a can broadcast a packet signal during the roadside-to-vehicle communication period, which is the start of the first sub-frame, and the terminal device 14 can broadcast a packet signal during an inter-vehicle communication period other than the roadside-to-vehicle communication period in the frame.

FIG. 3(c) illustrates a configuration of a frame generated by a second base station device 10b (not illustrated). The second base station device 10b sets a roadside-to-vehicle communication period at the start of a second sub-frame. Furthermore, the second base station device 10b sets an inter-vehicle communication period in a period of the second sub-frame excluding the roadside-to-vehicle communication period, the first sub-frame, and the third sub-frame through the N-th sub-frame. FIG. 3(d) illustrates a configuration of a frame generated by a third base station device 10c (not illustrated). The third base station device 10c sets a roadside-to-vehicle communication period at the start of the third sub-frame. Furthermore, the third base station device 10c sets an inter-vehicle communication period in a period of the third sub-frame excluding the roadside-to-vehicle communication period, the first sub-frame, the second sub-frame, and the fourth sub-frame through the N-th sub-frame. In this way, the plurality of base station devices 10 select different sub-frames and set a roadside-to-vehicle communication period at the start of the selected sub-frames. See FIG. 2 again. The selection unit 34 supplies a number of the selected sub-frame to the generation unit 36.

The generation unit 36 receives the number of the sub-frame from the selection unit 34. The generation unit 36 sets a roadside-to-vehicle communication period in the sub-frame having the received sub-frame number, and generates a packet signal that should be broadcast in the roadside-to-vehicle communication period. In a case where a plurality of packet signals are transmitted during one roadside-to-vehicle communication period, the generation unit 36 generates these packet signals. A packet signal is made up of control information and a payload. The control information includes, for example, a number of a sub-frame in which a roadside-to-vehicle communication period has been set. The payload includes, for example, accident information, traffic jam information, and traffic signal information. These data are acquired from the network 202 (not illustrated) by the network communication unit 30. The process unit 26 causes the modem unit 24 and the RF unit 22 to broadcast a packet signal during the roadside-to-vehicle communication period. The control unit 28 controls the process of the whole base station device 10.

This configuration is realized by a CPU, memory, and other LSI of any computer in the case of hardware and is realized by a program loaded to memory in the case of software. In FIG. 2, functional blocks realized by cooperation of these are illustrated. Therefore, it is understood by a person skilled in the art that these functional blocks are realized in various forms by hardware only or by a combination of hardware and software.

Figure 4:
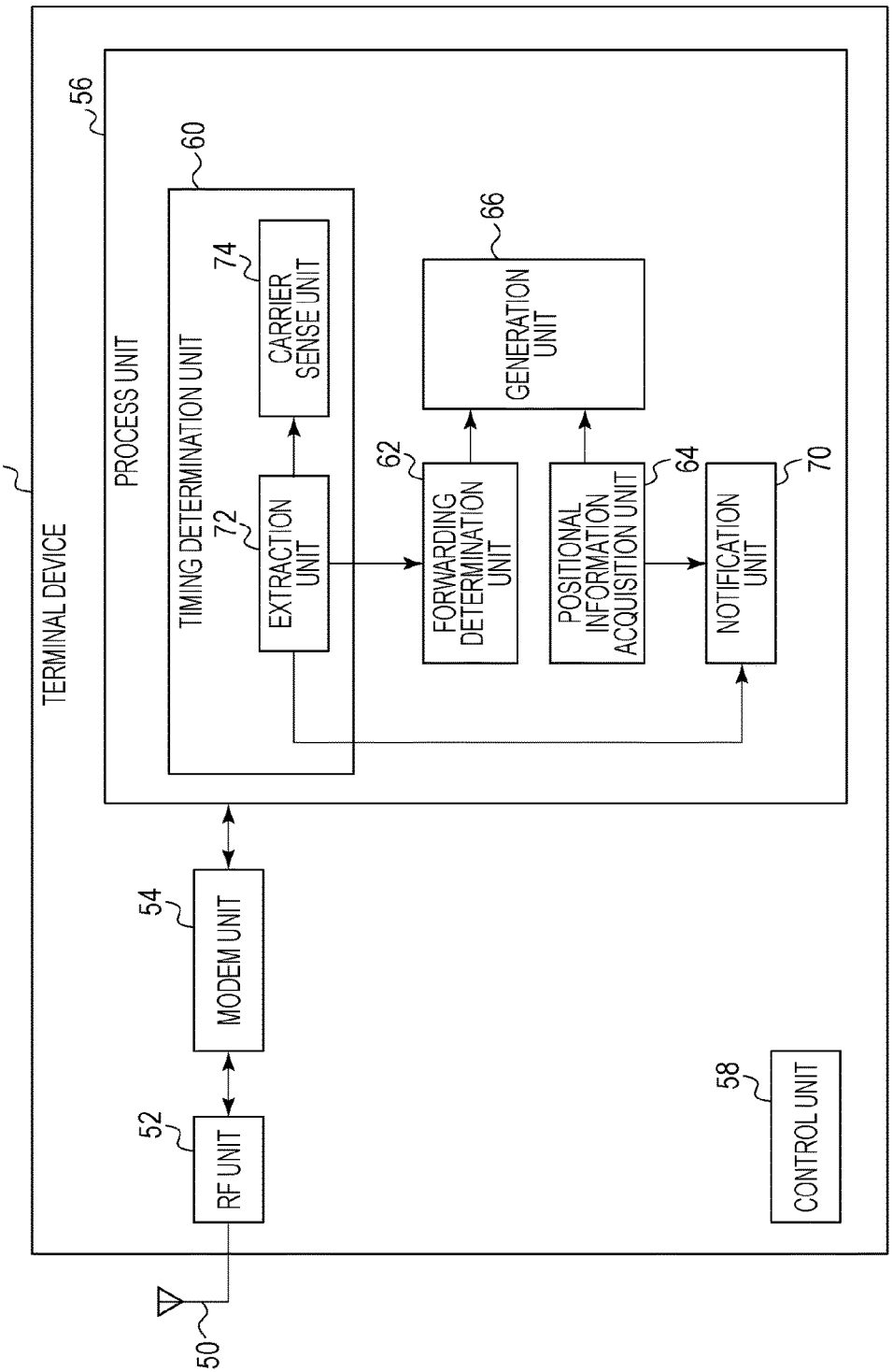
FIG. 4 is a diagram illustrating a configuration of a terminal device of FIG. 1.

FIG. 4 illustrates a configuration of the terminal device 14. The terminal device 14 includes an antenna 50, an RF unit 52, a modem unit 54, a process unit 56, and a control unit 58. The process unit 56 includes a timing determination unit 60, a forwarding determination unit 62, a positional information acquisition unit 64, a generation unit 66, and a notification unit 70. The timing determination unit 60 includes an extraction unit 72 and a carrier sense unit 74. The terminal device 14 can be mounted in each of the vehicles 12 as described above. The antenna 50, the RF unit 52, and the modem unit 54 perform similar processes to the antenna 20, the RF unit 22, and the modem unit 24 of FIG. 2. The following discusses mainly differences.

The modem unit 54 and the process unit 56 receive, in a receiving process, a packet signal from another terminal device 14 or the base station device 10 (not illustrated). As described above, the modem unit 54 and the process unit 56 receive a packet signal from the base station device 10 during a roadside-to-vehicle communication period, and receive a packet signal from another terminal device 14 during an inter-vehicle communication period. The packet signal from another terminal device 14 includes at least the current position, traveling direction, traveling speed, and the like (hereinafter collectively referred to as "positional information") of another vehicle 12 in which another terminal device 14 is mounted. Acquisition of positional information of another terminal device 14 can be performed by using a known technique, and description thereof is omitted.

In a case where a demodulation result supplied from the modem unit 54 is a packet signal from the base station device 10 (not illustrated), the extraction unit 72 specifies a timing of a sub-frame in which a roadside-to-vehicle communication period is set. In this case, the extraction unit 72 estimates that the terminal device 14 is within the area 212 of FIG. 1. The extraction unit 72 generates a frame on the basis of the timing of the sub-frame and the contents of a message header of the packet signal, specifically, the contents of the roadside-to-vehicle communication period. Note that generation of the frame is performed in the same manner as the frame control unit 32, and description thereof is omitted. As a result, the extraction unit 72 generates a frame that is in synchronization with the frame generated in the base station device 10. In a case where a source of broadcast of the packet signal is another terminal device 14, the extraction unit 72 omits a process of generating a synchronized frame, but extracts positional information included in the packet signal and supplies the extracted positional information to the notification unit 70.

Meanwhile, in a case where the packet signal from the base station device 10 is not received, the extraction unit 72 estimates that the terminal device 14 is within the outside area 214 of FIG. 1. In a case where the extraction unit 72 estimates that the terminal device 14 is within the area 212, the extraction unit 72 selects an inter-vehicle communication period. In a case where the extraction unit 72 estimates that the terminal device 14 is within the outside area 214, the extraction unit 72 selects a timing that is not related to the configuration of the frame. In a case where the extraction unit 72 selects the inter-vehicle communication period, the extraction unit 72 supplies information concerning timings of the frame and the sub-frame and the inter-vehicle communication period to the carrier sense unit 74. In a case where the extraction unit 72 selects a timing that is not related to the configuration of the frame, the extraction unit 72 instructs the carrier sense unit 74 to perform carrier sense.

The carrier sense unit 74 accepts the information concerning timings of the frame and the sub-frame and the inter-vehicle communication period from the extraction unit 72. The carrier sense unit 74 determines a transmission timing by starting CSMA/CA during the inter-vehicle communication period. Meanwhile, in a case where the carrier sense unit 74 is instructed by the extraction unit 72 to perform carrier sense that is not related to the configuration of the frame, the carrier sense unit 74 determines a transmission timing by performing CSMA/CA without considering the configuration of the frame. The carrier sense unit 74 notifies the modem unit 54 and the RF unit 52 of the determined transmission timing and causes the modem unit 54 and the RF unit 52 to broadcast a packet.

The forwarding determination unit 62 controls transfer of the control information. The forwarding determination unit 62 extracts information to be transferred from the control information. The forwarding determination unit 62 generates information that should be transferred on the basis of the extracted information. Description of this process is omitted. The forwarding determination unit 62 supplies the information that should be transferred, i.e., part of the control information to the generation unit 66.

The positional information acquisition unit 64 includes a GPS receiver, a gyroscope, a vehicle speed sensor, and the like (not illustrated), and acquires the current position, travelling direction, traveling speed, and the like (collectively referred to as "positional information" as described above) of the vehicle 12 (not illustrated), i.e., the vehicle 12 in which the terminal device 14 is mounted on the basis of data supplied from the GPS receiver, the gyroscope, the vehicle speed sensor, and the like. The current position is indicated by latitude and longitude. The acquisition of the current position, travelling direction, traveling speed, and the like can be performed by using a known art, and description thereof is omitted. The positional information may include the current position, traveling speed, and the like of a vehicle around (e.g., a vehicle running ahead or behind) detected by the vehicle 12 in which the terminal device 14 is mounted by using the autonomous sensor or the like. The positional information acquisition unit 64 supplies the positional information to the generation unit 66.

The generation unit 66 accepts the positional information from the positional information acquisition unit 64 and accepts part of the control information from the forwarding determination unit 62. The generation unit 66 generates a packet signal including these pieces of information and broadcasts the generated packet signal via the modem unit 54, the RF unit 52, and the antenna 50 at the transmission timing determined by the carrier sense unit 74. This corresponds to inter-vehicle communication.

The notification unit 70 receives the positional information from the positional information acquisition unit 64 and receives the positional information from the extraction unit 72. The former positional information corresponds to the positional information of the other vehicle 12, and the latter positional information corresponds to the positional information of the host vehicle 12. The notification unit 70 determines the presence or absence of collision between the host vehicle 12 and the other vehicle 12 on the basis of the positional information of the host vehicle 12 and the positional information of the other vehicle 12. A known technique can be used to determine the presence or absence of collision. For example, a future position is estimated on the basis of the current position of the host vehicle 12 in consideration of the traveling direction and the traveling speed, and a future position is estimated on the basis of the current position of the other vehicle 12 in consideration of the traveling direction and the traveling speed.

The notification unit 70 determines that collision occurs in a case where the future positions of the host vehicle 12 and the other vehicle 12 are close to each other and determines that collision does not occur in the other cases. A case where the future positions of the host vehicle 12 and the other vehicle 12 are close to each other corresponds to a case where a distance between the future positions of the host vehicle 12 and the other vehicle 12 is shorter than a threshold value, and a case where the future positions of the host vehicle 12 and the other vehicle 12 are not close to each other corresponds to the other cases. Such determination is performed regularly, for example, at intervals of 100 msec, which is a frame period. The notification unit 70 notifies a driver of a determination result by using a display or a speaker (not illustrated). Furthermore, the notification unit 70 may notify the driver of information included in a packet signal supplied from another terminal device 14 or the base station device 10 by using the display or the speaker.

Figure 5:
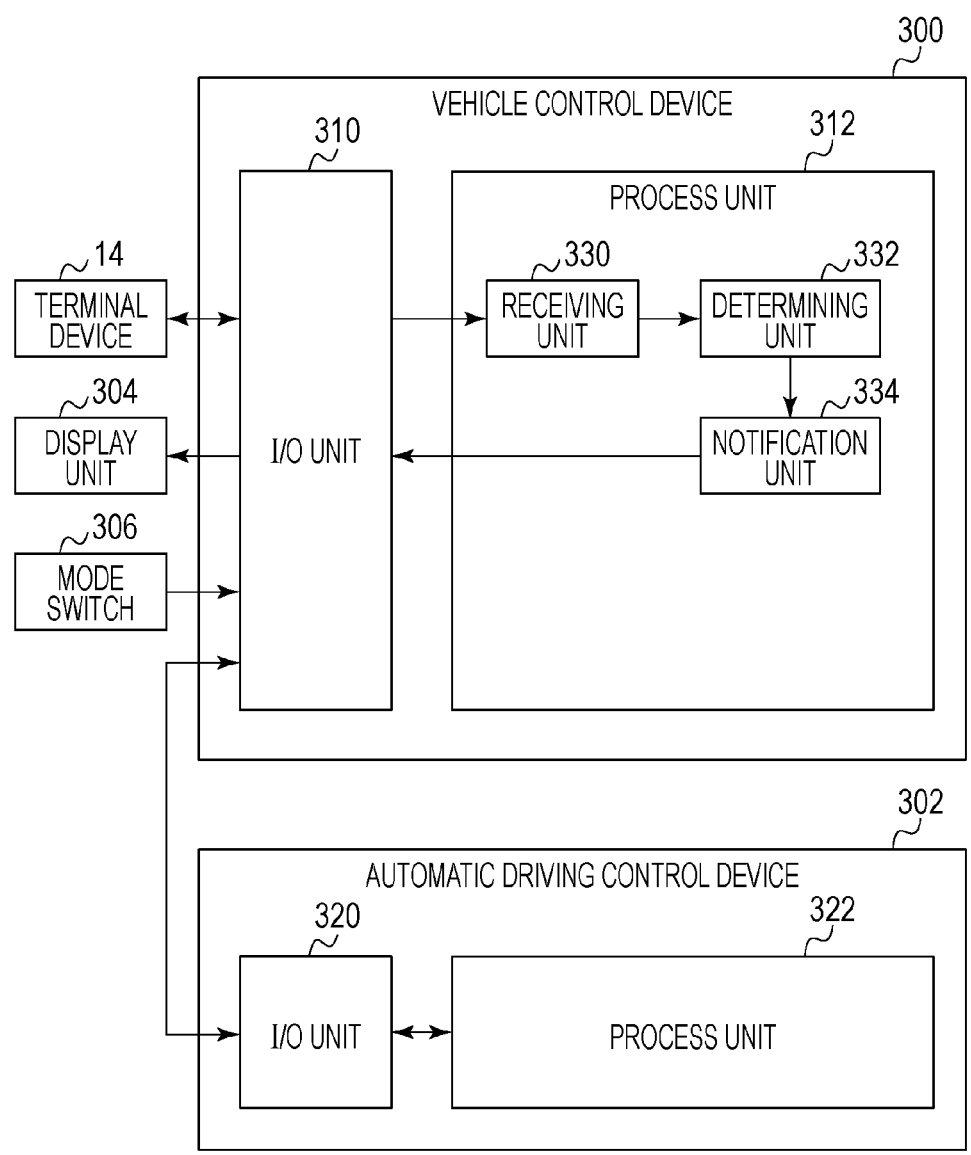
FIG. 5 is a diagram illustrating a configuration of a vehicle according to Embodiment 1 of the present disclosure.

FIG. 5 is a diagram illustrating a configuration of a vehicle 12 according to Embodiment 1 of the present disclosure. FIG. 5 illustrates especially a configuration related to automatic driving. The vehicle 12 includes the terminal device 14, a vehicle control device 300, an automatic driving control device 302, a display unit 304, and a mode switch 306. The vehicle control device 300 includes an I/O unit 310 and a process unit 312, and the process unit 312 includes a receiving unit 330, a determining unit 332, and a notification unit 334. The automatic driving control device 302 includes an I/O unit 320 and a process unit 322.

The terminal device 14 is configured as described above. The terminal device 14 supplies, to the I/O unit 310, positional information included in a packet signal received from another terminal device 14, i.e., positional information of another vehicle 12. The terminal device 14 also supplies positional information thereof to the I/O unit 310. The display unit 304 visually notifies a driver of information for the driver and is, for example, a display of a car navigation device or a display audio device. The display unit 304 may be an HUD (Head Up Display) for displaying an image on a windshield or may be a display of a smartphone or a tablet that is provided on a dashboard and operates in association with the vehicle control device 300 that will be described later. The display unit 304 may be the display on which the notification unit 70 of the terminal device 14 displays information.

The mode switch 306 is a switch that is operated by a driver and is a switch for switching between an automatic steering mode and a manual steering mode. A switching signal from the mode switch 306 is transmitted to the vehicle control device 300 through a signal line.

The automatic driving control device 302 is an automatic driving control having an automatic driving control function. The configuration of the process unit 322 can be realized by cooperation of a hardware resource and a software resource or only by a hardware resource. A processor, a ROM, a RAM, and other LSI can be used as the hardware resource, and programs such as an operating system, an application, and firmware can be used as the software resource. The I/O unit 320 performs various kinds of communication control processes according to various kinds of communication formats.

The vehicle control device 300 is a control for executing a driving mode determining function. The process unit 312 can be realized by cooperation of a hardware resource and a software resource or only by a hardware resource. A processor, a ROM, a RAM, and other LSI can be used as the hardware resource, and programs such as an operating system, an application, and firmware can be used as the software resource. The I/O unit 310 performs various kinds of communication control processes according to various kinds of communication formats. The vehicle control device 300 and the automatic driving control device 302 are directly connected to each other through a signal line. Note that the vehicle control device 300 and the automatic driving control device 302 may be connected to each other over a CAN (Controller Area Network). The vehicle control device 300 and the automatic driving control device 302 may be united as a single control.

Figure 6:
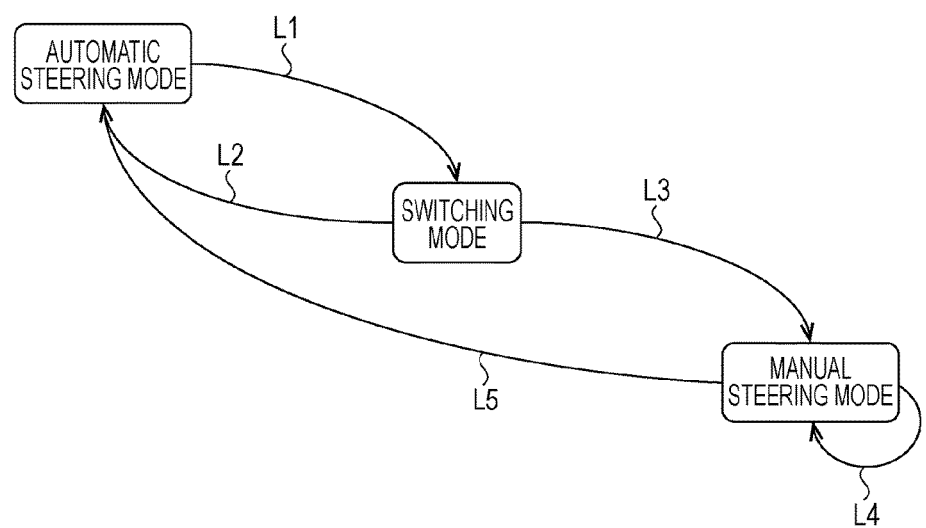
FIG. 6 is a diagram illustrating transition among modes managed in a process unit of FIG. 5.

The process unit 312 manages driving modes of the automatic driving control device 302. In this example, the automatic steering mode, the manual steering mode, and a switching mode are defined as the driving modes. The automatic steering mode is, for example, a mode in which the vehicle 12 is in charge of driving. The manual steering mode is, for example, a mode in which the driver drives the vehicle 12. FIG. 6 is a diagram illustrating transition among the modes managed in the process unit 312. As illustrated in FIG. 6, the switching mode is provided at a point in transition from the automatic steering mode to the manual steering mode in order to avoid direct switching from the automatic steering mode and the manual steering mode. This is because it is difficult for the driver to react if direct switching from the automatic steering mode to the manual steering mode occurs. Meanwhile, even in a case where direct switching from the manual steering mode to the automatic steering mode occurs, the driver can react, and therefore no switching mode is provided anywhere in transition from the manual steering mode to the automatic steering mode.

A line L1 indicates state transition from the automatic steering mode to the switching mode that occurs in a case where it is determined that the automatic steering mode will not be able to be maintained after elapse of several seconds or after traveling several meters. A line L2 indicates state transition from the switching mode to the automatic steering mode that occurs in a case where it is determined that the automatic steering mode is executable. A line L3 indicates state transition from the switching mode to the manual steering mode that occurs in a case where the mode switch 306 is pressed down by the driver.

A line L4 indicates state transition from the manual steering mode to the manual steering mode that occurs in a case where the driver switches the manual steering mode to the automatic steering mode but it is determined that the automatic steering mode is not executable. A line L5 indicates state transition from the manual steering mode to the automatic steering mode that occurs in a case where the driver switches the manual steering mode to the automatic steering mode and it is determined that the automatic steering mode is executable. A determining process in the line L1 is described below. See FIG. 5 again.

The receiving unit 330 receives the positional information of the host vehicle 12 from the terminal device 14 via the I/O unit 310. This corresponds to receiving the positional information acquired by the positional information acquisition unit 64. As described above, the positional information includes at least information such as the current position, travelling direction, and travelling speed. For convenience of description, this positional information is referred to as "first positional information". Furthermore, the receiving unit 330 receives positional information of another vehicle 12 from the terminal device 14 via the I/O unit 310. This corresponds to receiving positional information included in a packet signal transmitted from another terminal device 14 mounted in the other vehicle 12. For convenience of description, this positional information is referred to as "second positional information". The second positional information may include information concerning a traffic lane on which the other vehicle 12 is running in addition to the information included in the first positional information. The receiving unit 330 supplies the first positional information and the second positional information to the determining unit 332.

Figure 7:
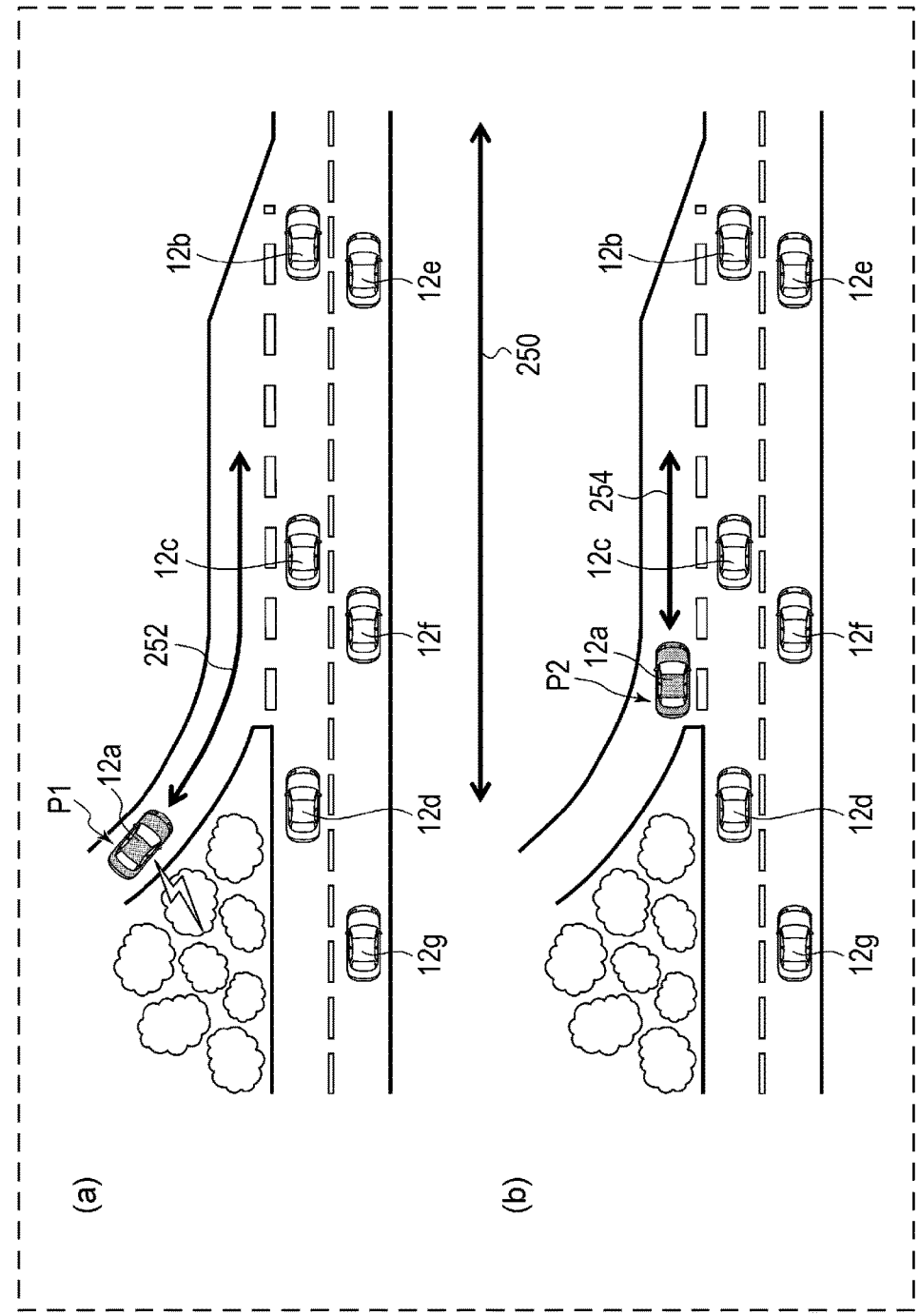
FIG. 7 is a diagram for explaining an outline of a process performed by the process unit of FIG. 5.

The determining unit 332 receives the first positional information and the second positional information from the receiving unit 330. The determining unit 332 determines whether or not to switch the automatic steering mode to the manual steering mode on the basis of the first positional information and the second positional information received from the receiving unit 330. This determining process is described with reference to FIG. 7. FIG. 7 is a diagram for explaining an outline of the process performed by the process unit 312. More specifically, FIGS. 7(a) and 7(b) are diagrams each illustrating a scene where a vehicle merges into a main lane on an expressway or the like. A first vehicle 12a in FIG. 7(a) corresponds to the host vehicle 12. The first vehicle 12a is running on a merging lane in the automatic steering mode, and second through seventh vehicles 12b through 12g (hereinafter sometimes collectively referred to as "other vehicles 12") are running on the main lane. The first vehicle 12a is trying to merge from the merging lane into the main lane. The terminal device 14 mounted in the first vehicle 12a exchanges positional information with the other terminal device 14 mounted in the other vehicle 12. Thus, the determining unit 332 receives the first positional information and the second positional information as described above.

The determining unit 332 recognizes a situation illustrated in FIG. 7(a), i.e., a situation where the first vehicle 12a is trying to merge into the main lane vehicles by associating the first positional information with map information stored in advance. Furthermore, the determining unit 332 derives the density of the other vehicles 12 on the main lane on the basis of the second positional information. This corresponds to counting the number of other vehicles 12 running on a merging section 250 of the main lane. In a case where the density is lower than a threshold value, the determining unit 332 determines that the automatic steering mode can be maintained. Meanwhile, in a case where the density is equal to or higher than the threshold value, the determining unit 332 determines that it is difficult to maintain the automatic steering mode. This corresponds to a situation where it is difficult for the first vehicle 12a that is running on the merging lane to merge in the automatic steering mode because of a traffic jam on the merging section 250 of the main lane. Note that the determining unit 332 may derive an average of distances between other vehicles 12 on the main lane on the basis of the second positional information. In this case, in a case where the distance is longer than a threshold value, the determining unit 332 determines that the automatic steering mode can be maintained, whereas in a case where the distance is equal to or shorter than the threshold value, it is determined that it is difficult to maintain the automatic steering mode.

This corresponds to determining to switch the automatic steering mode to the manual steering mode on the basis of the positional information of the other vehicles 12 and corresponds to transition to the switching mode along the line L1 of FIG. 6. FIG. 7(b) will be described later. See FIG. 5 again. The determining unit 332 changes a current operation mode from the automatic steering mode to the switching mode, and the process unit 312 manages the switching mode as the current operation mode. Furthermore, the determining unit 332 notifies the notification unit 334 of the change to the switching mode.

The notification unit 334 supplies a signal for prompting the driver to perform switching to the manual steering mode to the display unit 304 via the I/O unit 310 in a case where the notification unit 334 is notified of the change to the switching mode, i.e., in a case where the determining unit 332 determines to switch to the switching mode. When the display unit 304 receives the signal via the I/O unit 310, the display unit 304 causes a message prompting the driver to perform switching to the manual steering mode to be displayed on the display.

When the driver agrees with this message and presses down the mode switch 306, a switching signal is transmitted to the vehicle control device 300 as described above. Furthermore, the switching signal is transmitted from the vehicle control device 300 to the automatic driving control device 302. Upon receipt of the switching signal, the automatic driving control device 302 switches the vehicle 12 from the automatic steering mode to the manual steering mode. When the process unit 312 receives the switching signal in the vehicle control device 300, the process unit 312 manages the manual steering mode as the current operation mode.

Meanwhile, there are cases where the driver does not press down the mode switch 306 even in a case where the message prompting the driver to perform switching to the manual steering mode is displayed on the display. In order to cope with such cases, the process unit 312 measures a travelling period or a travelling distance from output of the signal prompting the driver to perform switching to the manual steering mode. In a case where a certain travelling period or a certain travelling distance passes without receipt of the switching signal from the mode switch 306, the process unit 312 determines to stop the vehicle 12 in the automatic steering mode. The process unit 312 supplies a result of determination indicating stoppage of the vehicle 12 to the automatic driving control device 302 via the I/O unit 310. Upon receipt of the result of determination, the automatic driving control device 302 stops the vehicle 12 to a safe place.

In FIG. 7(a), the vehicle control device 300 (not illustrated) mounted in the first vehicle 12a displays, at a point P1, the message prompting the driver to perform switching to the manual steering mode. In a case where the driver presses down the mode switch 306 while the first vehicle 12a is running on an authority handover section 252, the first vehicle 12a is switched from the automatic steering mode to the manual steering mode. Accordingly, a period or a distance corresponding to the authority handover section 252 is secured so that the driver who confirms the message can press down the mode switch 306.

Meanwhile, FIG. 7(b) illustrates, for comparison with the present embodiment, a case where an autonomous sensor determines that it is difficult to maintain the automatic steering mode. Since an area that is detectable by the autonomous sensor is narrow as described above, the message prompting the driver to perform switching to the manual steering mode is displayed at a point P2. This forces the driver to give an instruction to switch the mode while the first vehicle 12a is running on an authority handover section 254. The authority handover section 254 is shorter than the authority handover section 252. See FIG. 5 again.

The determining process in the determining unit 332 may be performed as follows. A packet signal received by the terminal device 14 sometimes includes event information. The event information is information indicative of an unusual traffic condition such as information indicating that a one-side alternate traffic section is set due to construction or information indicating that flag signaling is temporarily performed at a traffic intersection. The receiving unit 330 receives the event information from the terminal device 14 via the I/O unit 310. The receiving unit 330 supplies the event information to the determining unit 332. Upon receipt of the even information, the determining unit 332 specifies positional information indicated by the event information. This positional information indicates, for example, a place of a one-side alternate traffic section and is referred to as a "third positional information" for convenience of description. The determining unit 332 determines that it is difficult to maintain the automatic steering mode in a case where the first positional information is within a predetermined range from the third positional information. That is, the determining unit 332 determines whether to switch the automatic steering mode to the manual steering mode on the basis of the event information.

Figure 8:
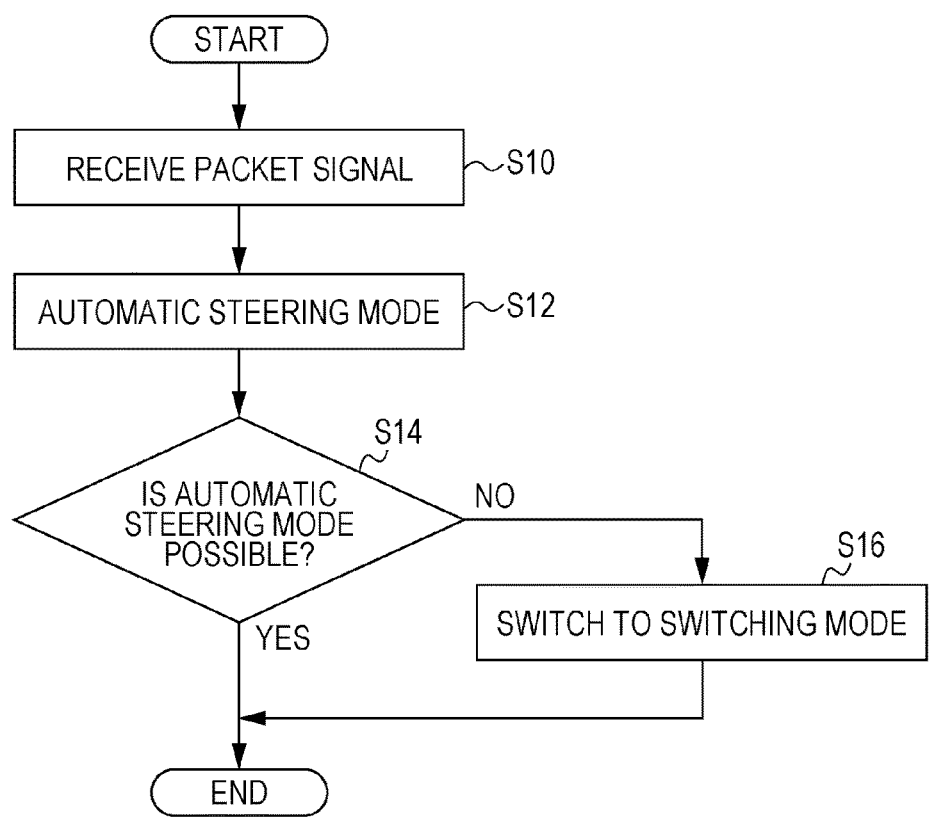
FIG. 8 is a flow chart illustrating a procedure of processes performed by a vehicle control device of FIG. 5 in an automatic steering mode.

An operation of the vehicle control device 300 configured as above is described below. FIG. 8 is a flow chart illustrating a procedure of processes performed in the automatic steering mode by the vehicle control device 300. The terminal device 14 receives a packet signal (S10). The process unit 312 executes the automatic steering mode (S12). In a case where the automatic steering mode is not possible (N in S14), the determining unit 332 determines to switch to the switching mode (S16). In a case where the automatic steering mode is possible (Y in S14), Step S16 is skipped.

Figure 9:
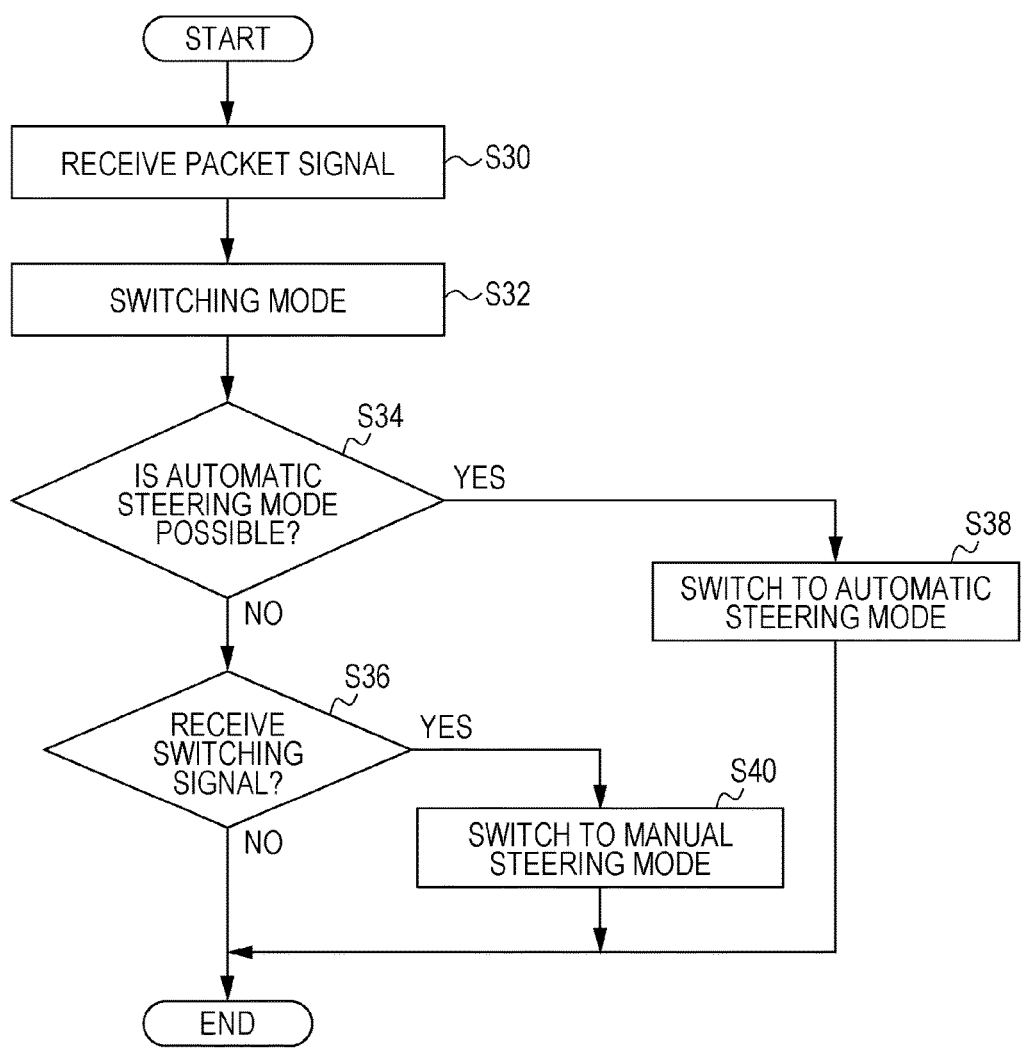
FIG. 9 is a flow chart illustrating a procedure of processes performed by the vehicle control device of FIG. 5 in a switching mode.

FIG. 9 is a flow chart illustrating a procedure of processes performed in the switching mode by the vehicle control device 300. The terminal device 14 receives a packet signal (S30). The process unit 312 executes the switching mode (S32). In a case where the automatic steering mode is possible (Y in S34), the process unit 312 determines to switch to the automatic steering mode (S38). In a case where the automatic steering mode is not possible (N in S34) and where a switching signal is received (Y in S36), the process unit 312 performs switching to the manual steering mode (S40). In a case where no switching signal is received (N in S36), Step 40 is skipped.

According to the embodiment of the present disclosure, since it is determined whether or not to switch the automatic steering mode to the manual steering mode on the basis of a packet signal received from a wireless device mounted in another vehicle, the determining process can be performed earlier. Furthermore, since the determining process can be performed earlier, the automatic steering mode can be smoothly switched to the manual steering mode. Furthermore, since a packet signal received from a wireless device mounted in another vehicle is used, information on a wider range than an autonomous sensor can be acquired. Furthermore, since a packet signal received from a wireless device mounted in another vehicle is used, it is possible to avoid difficulty of continuation of the automatic steering mode based on a positional relationship with the other vehicle. Furthermore, it is possible to avoid difficulty of continuation of the automatic steering mode based on the event information.

Embodiment 2

Next, Embodiment 2 of the present disclosure is described. Embodiment 2 relates to a vehicle control device mounted in a vehicle that can switch between an automatic steering mode and a manual steering mode and uses positional information acquired in a communication system, as in Embodiment 1. Conventionally, in a case where merging occurs as in Embodiment 1, a device that controls travelling of all of a plurality of vehicles related to the merging is provided, and each of the vehicles runs in accordance with a command from the device. However, in a case where a vehicle in the automatic steering mode merges, parameters for determining a travelling route and a travelling speed (hereinafter collectively referred to as "travelling schedule") are affected by not only the position and speed, but also other factors. The other factors are, for example, the presence of an obstacle, characteristics of a vehicle (acceleration performance and braking performance), characteristics and preference (e.g., preference concerning an inter-vehicle distance) of a driver, and the like. In a case where a vehicle runs in accordance with a command, it is difficult to create the travelling schedule in consideration of these other factors.

In view of this, in a case where a vehicle is running on a merging lane, a vehicle control device according to the present embodiment creates travelling schedule information on the basis of positional information of another vehicle running on a main lane that is acquired through communication so that the vehicle can merge into a place ahead or behind the other vehicle running on the main lane in the automatic steering mode. Furthermore, the vehicle control device notifies the other vehicle running on the main lane of schedule of merging by transmitting the travelling schedule information through inter-vehicle communication. The other vehicle recognizes the presence of the vehicle that is trying to merge on the basis of the travelling schedule information and controls travelling in accordance with the travelling schedule information. A communication system 100 according to Embodiment 2 is similar to that illustrated in FIGS. 1 through 4, and differences are mainly described below. Note that in a case where there is no other vehicle running on the main lane in the automatic steering mode at a merging timing, switching between the automatic steering mode and the manual steering mode need just be executed by performing a determining process in accordance with the procedure of Embodiment 1.

Figure 10:
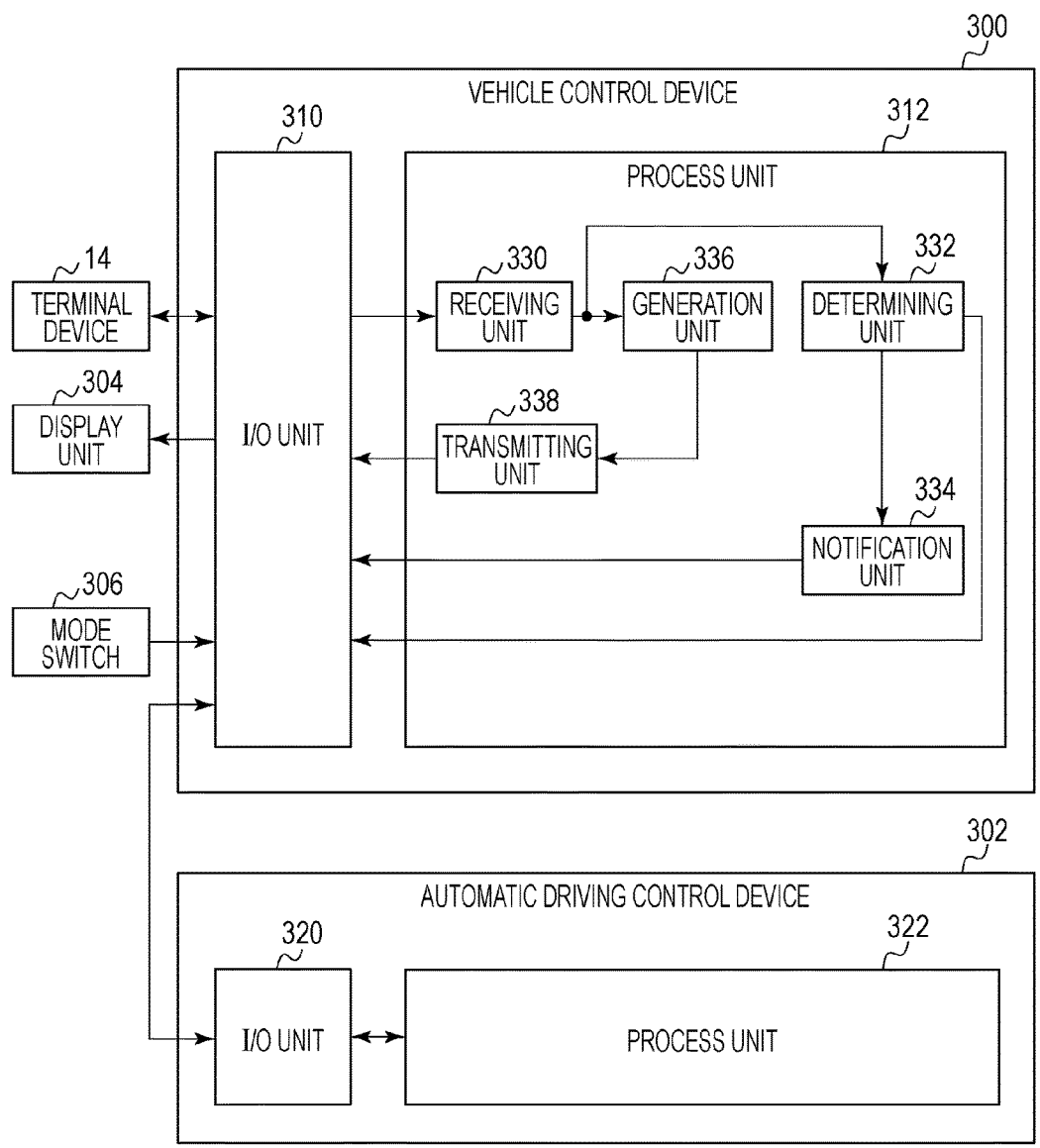
FIG. 10 is a diagram illustrating a configuration of a vehicle according to Embodiment 2 of the present disclosure.

FIG. 10 is a diagram illustrating a configuration of a vehicle 12 according to Embodiment 2 of the present disclosure. The vehicle 12 includes a terminal device 14, a vehicle control device 300, an automatic driving control device 302, a display unit 304, and a mode switch 306. The vehicle control device 300 includes an I/O unit 310 and a process unit 312, and the process unit 312 includes a receiving unit 330, a determining unit 332, a notification unit 334, a generation unit 336, and a transmitting unit 338. The automatic driving control device 302 includes an I/O unit 320 and a process unit 322.

The receiving unit 330 receives first positional information and second positional information as described above. The receiving unit 330 supplies the first positional information and the second positional information to the generation unit 336. The generation unit 336 receives the first positional information and the second positional information from the receiving unit 330. The generation unit 336 generates travelling schedule information of the host vehicle 12 in the automatic steering mode on the basis of the first positional information and the second positional information before a determining process in the determining unit 332. In generation of the travelling schedule information, the current position, travelling direction, and travelling speed in the first positional information and the second positional information are used. The generation unit 336 generates the travelling schedule information by executing (1) creation of reference schedule information, (2) determination of interference with another vehicle 12 on a main lane, and (3) modification of the reference schedule information. These processes are described below with reference to FIG. 11.

Figure 11:
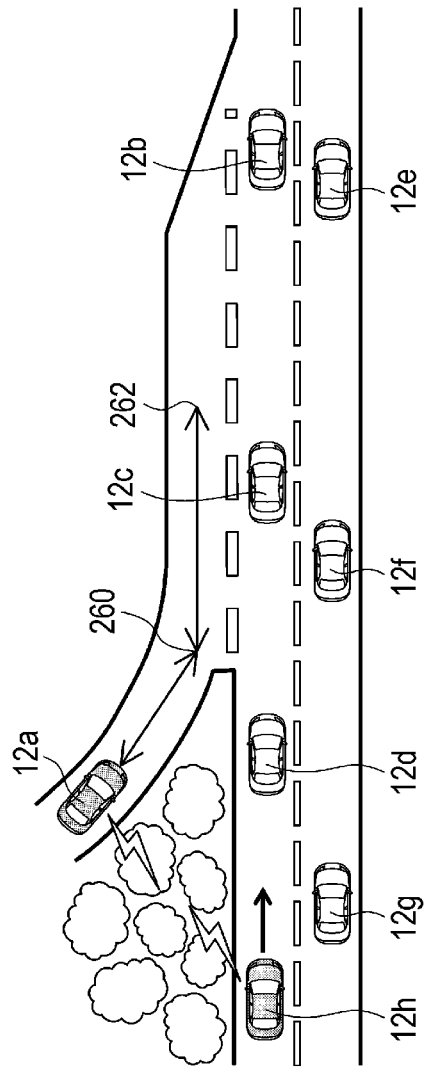
FIG. 11 is a diagram for explaining an outline of a process performed by a process unit of FIG. 10.

FIG. 11 is a diagram for explaining an outline of a process performed by the process unit 312. FIG. 11 illustrates a merging lane and a main lane of an expressway or the like as in FIG. 7(a), and a first vehicle 12a which is the host vehicle 12 is running on the merging lane. Second through eighth vehicles 12b through 12h are running on the main lane and are sometimes collectively referred to as "other vehicles 12".

(1) Creation of Reference Schedule Information

The generation unit 336 assumes that the first vehicle 12a runs at a merging lane regulatory speed from a current position to a merging section near end 260. Furthermore, the generation unit 336 assumes that the first vehicle 12a runs from the merging section near end 260 at an acceleration so that the speed thereof increases from the merging lane regulatory speed to a main lane regulatory speed. Furthermore, on these assumptions, the generation unit 336 derives a distance from the merging section near end 260 at a time when the first vehicle 12a reaches the main lane regulatory speed, i.e., a merging start point 262 and derives a period taken for the first vehicle 12a to reach the main lane regulatory speed, i.e., a merging start period.

(2) Determination of Interference with Another Vehicle 12 on Main Lane

The generation unit 336 derives a distance L between another vehicle 12 and the merging section near end 260 after elapse of the merging start period obtained from the reference schedule information on the basis of the position and travelling speed of the other vehicle 12. In a case where an absolute value of a difference between the distance L and the merging start point 262 is equal to or shorter than a predetermined safe inter-vehicle distance, the determining unit 332 determines that the first vehicle 12a and the other vehicle 12 interfere with each other. Note that it is also possible to employ an arrangement in which whether the first vehicle 12a merges into a place ahead of the other vehicle 12 or a place behind the other vehicle 12 is set in accordance with characteristics/preference of a driver and the safe inter-vehicle distance is changed in accordance with the setting.

(3) Modification of Reference Schedule Information

The generation unit 336 creates a non-interference route having a small difference from the reference schedule information in a case where the first vehicle 12a and the other vehicle 12 interfere with each other. Specifically, the generation unit 336 derives a speed at which the safe inter-vehicle distance from the other vehicle 12 can be secured after merging and at which the first vehicle 12a runs on the merging lane. Furthermore, the generation unit 336 derives a time at which the first vehicle 12a starts acceleration after passing the merging section near end 260 and acceleration at which the first vehicle 12a accelerates from the merging lane regulatory speed to the main lane regulatory speed. Note that in a case where the time and acceleration cannot be calculated, the generation unit 336 determines that merging is impossible. Furthermore, the generation unit 336 selects, as a modified route, a route having a small difference from the reference schedule, i.e., having the closest merging start point 262 and calculates the merging start point 262 and merging start period in the selected route. Finally obtained reference schedule information corresponds to the travelling schedule information. Note that the generation unit 336 may generate the travelling schedule information so that the first vehicle 12a merges into a place ahead of the other vehicle 12 running in the automatic steering mode among the other vehicles 12 running on the main lane. See FIG. 10 again.

As a result of these processes, essential information in the travelling schedule information generated by the generation unit 336 includes information on the merging start period during travelling on the merging lane. The merging start period indicates seconds before the start of merging. Optional information in the travelling schedule information includes information on a direction (up or down), a distance to the merging section near end 260, the merging start point 262, a merging vehicle position, a merging agreement situation, and a target speed at the time of completion of merging. The merging start point 262 indicates a distance from the merging section near end 260, the merging vehicle position indicates between which other vehicles 12 the first vehicle 12a enters by using a vehicle ID, and the merging agreement situation indicates a situation of agreement with the other vehicles 12 between which the first vehicle 12a enters.

The essential information indicates, for example, "merging state period during travelling on the merging lane: 20 s". The optional information indicates "direction: up", "distance to the merging section near end 260: 200 m", "merging start point 262: 70 m", "merging vehicle position: ahead of vehicle ID "Y"", "merging agreement situation: not approved by vehicle ID "Y"", and "target speed at the time of completion of merging: indefinite". The generation unit 336 supplies the travelling schedule information to the transmitting unit 338.

The transmitting unit 338 receives the travelling schedule information generated in the generation unit 336. The transmitting unit 338 transmits the travelling schedule information to the terminal device 14 via the I/O unit 310. The terminal device 14 broadcasts a packet signal including the travelling schedule information. The terminal device 14 receives a packet signal including a result indicating whether or not another vehicle 12 approves of the travelling schedule information included in the packet signal thus broadcast. The terminal device 14 transmits the result to the receiving unit 330 via the I/O unit 310.

The receiving unit 330 receives a result of approval. The receiving unit 330 receives a result indicating whether or not another vehicle approves of the travelling schedule information transmitted by the transmitting unit 338. Essential information of the result includes a result of determination as to whether or not merging is possible and indicates, for example, "vehicle ID: X OK". Optional information of the result includes a direction, a distance to the merging section near end 260, a period taken to reach the merging section near end 260, a forward inter-vehicle distance, a backward inter-vehicle distance, a right-side situation, and a left-side situation. The optional information indicates, for example, "direction: up", "distance to the merging section near end 260: 320 m", "period taken to reach the merging section near end 260: 15 seconds", "forward inter-vehicle distance: 120 m", and "backward inter-vehicle distance: 50 m". The receiving unit 330 supplies the result to the generation unit 336 and the determining unit 332.

The generation unit 336 confirms the result and generates the travelling schedule information again by performing the aforementioned processes. In a case where reference schedule information is created for the second or subsequent time, the reference schedule information created in the previous processes is used. For example, the essential information indicates "merging state period during travelling on the merging lane: 18 s". The optional information indicates "direction: up", "distance to the merging section near end: 150 m", "merging start point 262: 75 m", "merging vehicle position: ahead of vehicle ID "Y"", "merging agreement situation: not approved by vehicle ID "Y"", and "target speed at the time of completion of merging: 80 km/h". The generation unit 336 supplies the travelling schedule information to the transmitting unit 338. The generation unit 336 supplies the travelling schedule information to the transmitting unit 338 in a manner similar that described above.

The determining unit 332 determines to switch the automatic steering mode to the manual steering mode in a case where the result of determination as to whether or not merging is possible that is included in the result is No (i.e., Another vehicle does not approve of the travelling schedule information). That is, the determining unit 332 determines that it is difficult to maintain the automatic steering mode. Subsequent processes are similar to those described above.

Figure 12:
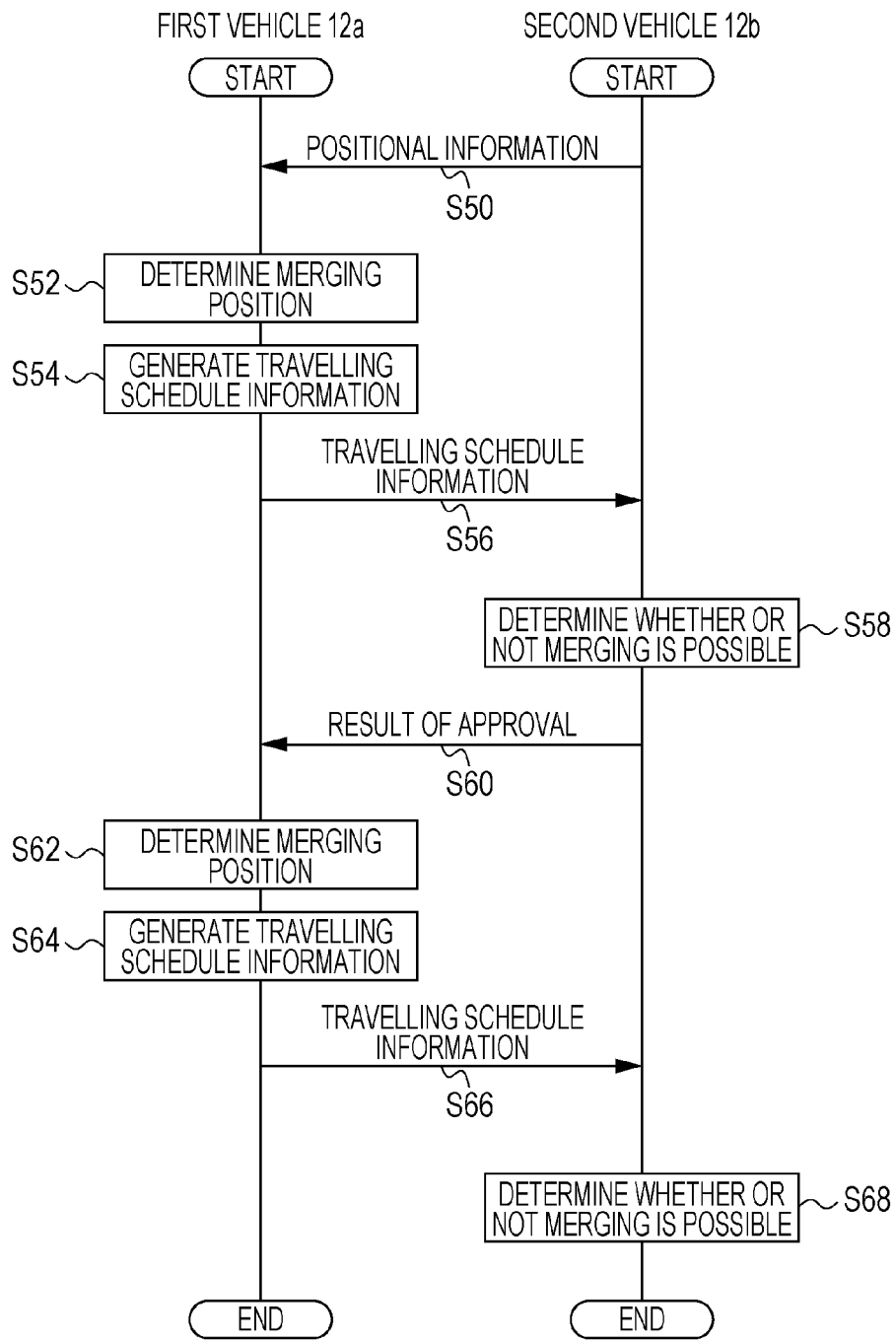
FIG. 12 is a sequence diagram illustrating a merging procedure performed between vehicles according to Embodiment 2 of the present disclosure.

An operation of the vehicle control device 300 configured as above is described. FIG. 12 is a sequence diagram illustrating a merging procedure performed between vehicles 12 according to Embodiment 2 of the present disclosure. The second vehicle 12b transmits positional information to the first vehicle 12a (S50). The first vehicle 12a determines a merging position (S52) and generates travelling schedule information (S54). The first vehicle 12a transmits the travelling schedule information to the second vehicle 12b (S56). The second vehicle 12b determines whether or not merging is possible (S58). The second vehicle 12b transmits a result including a result of determination by the second vehicle 12b as to whether or not merging is possible to the first vehicle 12a (S60). The first vehicle 12a determines a merging position (S62) and generates travelling schedule information (S64). The first vehicle 12a transmits the travelling schedule information to the second vehicle 12b (S66). The second vehicle 12b determines whether or not merging is possible (S68).

Figure 13:
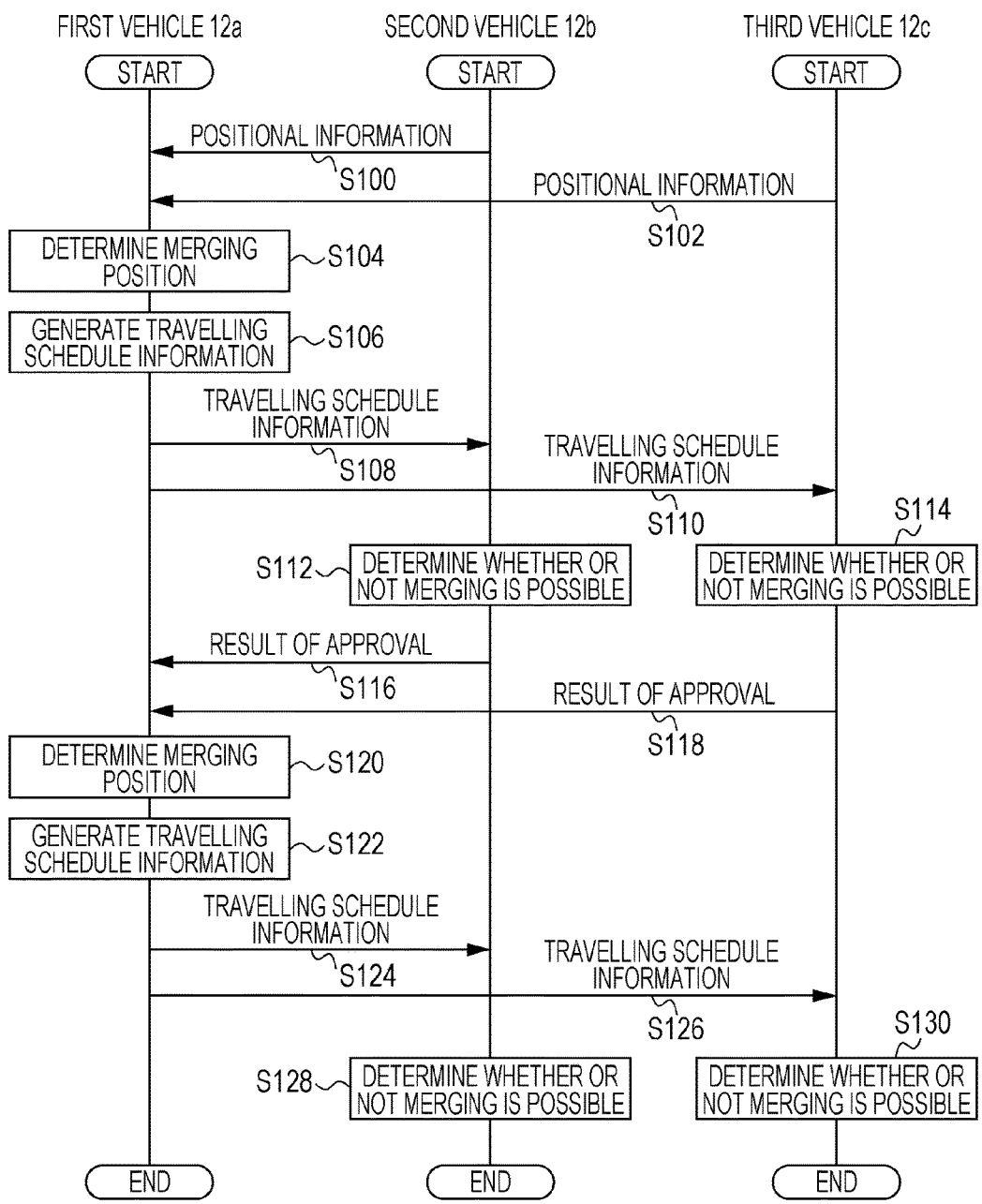
FIG. 13 is a sequence diagram illustrating another merging procedure performed among vehicles according to Embodiment 2 of the present disclosure.

FIG. 13 is a sequence diagram illustrating another merging procedure performed among vehicles 12 according to Embodiment 2 of the present disclosure. The second vehicle 12b transmits positional information to the first vehicle 12a (S100), and the third vehicle 12c transmits positional information to the first vehicle 12a (S102). The first vehicle 12a determines a merging position (S104) and generates travelling schedule information (S106). The first vehicle 12a transmits the travelling schedule information to the second vehicle 12b and the third vehicle 12c (S108 and S110). The second vehicle 12b determines whether or not merging is possible (S112), and the third vehicle 12c determines whether or not merging is possible (S114).

The second vehicle 12b transmits a result, indicating whether the second vehicle 12b approves or disapproves of travelling schedule information, to the first vehicle 12a (S116), and the third vehicle 12c transmits a result, indicating whether the third vehicle 12c approves or disapproves of travelling schedule information, to the first vehicle 12a (S118). The first vehicle 12a determines a merging position (S120) and generates travelling schedule information (S122). The first vehicle 12a transmits the travelling schedule information to the second vehicle 12b and the third vehicle 12c (S124 and S126). The second vehicle 12b determines whether or not merging is possible (S128), and the third vehicle 12c determines whether or not merging is possible (S130).

Figure 14:
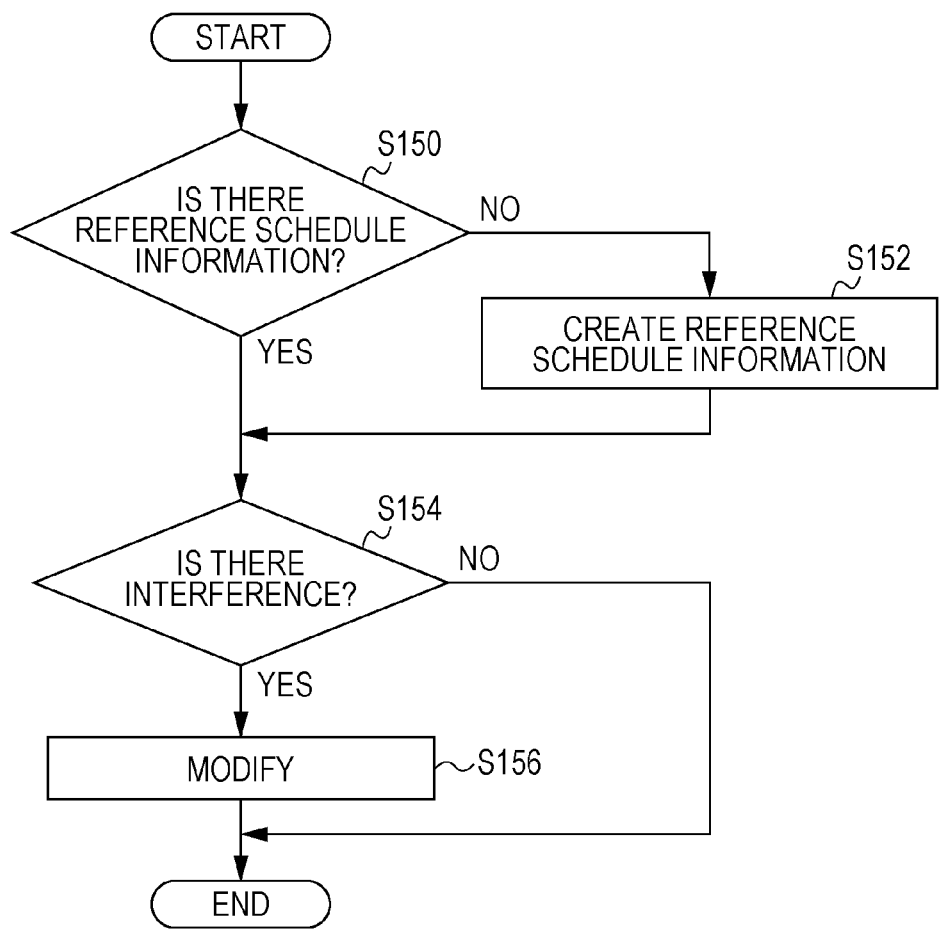
FIG. 14 is a flow chart illustrating a procedure for generating travelling schedule information in the vehicle control device according to Embodiment 2 of the present disclosure.

FIG. 14 is a flow chart illustrating a travelling schedule information generating procedure performed by the vehicle control device 300 according to Embodiment 2 of the present disclosure. In a case where there is no reference schedule information (N in S150), the generation unit 336 creates reference schedule information (S152). In a case where there is reference schedule information (Y in S150), Step S152 is skipped. In a case where there is interference (Y in S154), the generation unit 336 modifies the reference schedule information (S156). In a case where there is no interference (N in S154), Step S156 is skipped.

According to the embodiment of the present disclosure, since travelling schedule information is generated on the basis of positional information of another vehicle included in a received packet signal, the travelling schedule information can be generated earlier. Furthermore, since characteristics/preference of a driver are reflected in generation of the travelling schedule information, these characteristics/preference can be reflected. Furthermore, since a result, indicating whether another vehicle approves or disapproves of the travelling schedule information, is received, it can be recognized whether or not the travelling schedule information has been accepted. Furthermore, since it is determined to switch the automatic steering mode to the manual steering mode in a case where the result indicating that the other vehicle disapproved of the travelling schedule information, it can be recognized that the travelling schedule information has not been accepted. Furthermore, since the automatic steering mode is switched to the manual steering mode in a case where the travelling schedule information has not been accepted, it is possible to prevent occurrence of collision in the automatic steering mode. Furthermore, since a vehicle merges into a place ahead of another vehicle that is in the automatic steering mode, safety can be secured. Furthermore, it is possible to realize safer and smoother merging with no rapid acceleration or deceleration based on characteristics of a host vehicle.

The present disclosure has been described above on the basis of the embodiments. The embodiments are examples, and it will be understood by a person skilled in the art that a combination of constituent elements or processes can be modified in various ways and that such modifications are also encompassed within the scope of the present disclosure.

An outline of one aspect of the present disclosure is as follows. A vehicle control device according to an aspect of the present disclosure is a vehicle control device that is capable of being mounted in a vehicle, including: a receiver that receives information from a wireless device mounted in another vehicle; a determiner that determines whether or not to switch an automatic steering mode to a manual steering mode on the basis of the information received by the receiver; and a notifier that prompts a driver of the vehicle to switch the automatic steering mode to the manual steering mode in a case where the determiner determines to switch the automatic steering mode to the manual steering mode.

According to this aspect, it is determined whether or not an automatic steering mode is switched to a manual steering mode on the basis of information supplied from a wireless device mounted in another vehicle, the determining process can be performed earlier.

The vehicle control device may be arranged such that the receiver receives event information as the information and the determiner determines whether or not to switch the automatic steering mode to the manual steering mode on basis of the event information received by the receiver. In this case, it is possible to avoid difficulty of continuation of the automatic steering mode based on the event information.

The vehicle control device may be arranged such that the receiver receives positional information of the other vehicle as the information and the determiner determines whether or not to switch the automatic steering mode to the manual steering mode on basis of the positional information of the other vehicle received by the receiver. In this case, it is possible to avoid difficulty of continuation of the automatic steering mode based on a positional relationship with another vehicle.

The vehicle control device may be arranged such that the receiver receives positional information of the other vehicle as the information. And the vehicle control device may be arranged to further include a generator that generates travelling schedule information of the vehicle in the automatic steering mode on the basis of the positional information of the other vehicle received by the receiver before the determination in the determiner. In this case, since the travelling schedule information is generated on the basis of the received positional information of the other vehicle, the travelling schedule information can be generated earlier.

The vehicle control device may be arranged to further include a transmitter that transmits, by broadcast, the travelling schedule information generated by the generator, and the receiver may receive, as the information, a result indicating whether or not the other vehicle approves of the travelling schedule information transmitted by the transmitter. In this case, since a result of approval is received, it can be recognized whether or not the travelling schedule information has been accepted.

The vehicle control device may be arranged such that the determiner determines to switch the automatic steering mode to the manual steering mode in a case where the result, received by the receiver, indicates that the other vehicle does not approve of the travelling schedule information. In this case, since it is determined to switch the automatic steering mode to the manual steering mode in a case where the result of approval is disapproval, it can be recognized that the travelling schedule information has not been accepted.

The vehicle control device may be arranged such that at least one of the receiver, the determiner, and the notifier includes a processor.

In Embodiments 1 and 2 of the present disclosure, a case where a vehicle 12 running on a merging lane merges into a main lane is used as an example. However, the present disclosure is not limited to this and is applicable, for example, to a case where a vehicle 12 is required to make a lane change within a predetermined distance. In this case, the automatic steering mode is switched to the manual steering mode in a case where it is difficult for the vehicle 12 to make a lane change in an automatic running mode because a line of vehicles is long and an inter-vehicle distance is short on a lane to which the vehicle 12 is about to move. According to this modification, an application range can be widened.

What is claimed is:

1. An apparatus for a first vehicle, comprising:
    at least one of a camera or a radar provided on the first vehicle that detects within a sensing area around the first vehicle, the sensing area being detectable by the at least one of the camera or the radar,
    a processor that, when executing a program, performs operations including:
    receiving a result of detection of the at least one of the camera or the radar;
    receiving positional information from a wireless device mounted in a second vehicle outside the sensing area, the positional information including a current position of the second vehicle, a traveling direction of the second vehicle, and a traveling speed of the second vehicle;
    determining whether or not to switch an automatic steering mode to a manual steering mode on the basis of the result of detection of the at least one of the camera or the radar and the positional information; and
    prompting a driver of the first vehicle to manually switch the automatic steering mode to the manual steering mode before the second vehicle enters the sensing area.

2. The apparatus according to claim 1, wherein, in the receiving, the processor further receives event information from the wireless device mounted in the second vehicle, and
    wherein, in the determining, the processor determines whether or not to switch the automatic steering mode to the manual steering mode on the basis of the event information.

3. The apparatus according to claim 1, wherein
    the processor further performs generating travelling schedule information of the first vehicle in the automatic steering mode on the basis of the result of detection of the at least one of the camera or the radar and the positional information before it is determined whether or not to switch the automatic steering mode to the manual steering mode.

4. The apparatus according to claim 3, wherein the processor further performs operations including:
    transmitting, by broadcast, the generated travelling schedule information, and
    receiving a result, which indicates whether or not an other vehicle approves of the transmitted travelling schedule information.

5. The apparatus according to claim 4, wherein, in the determining, the processor further determines to switch the automatic steering mode to the manual steering mode when the received result indicates that the other vehicle does not approve of the travelling schedule information.

6. The apparatus according to claim 1, further comprising an I/O interface through which the processor receives the result of detection of the at least one of the camera or the radar and the positional information.

7. The apparatus according to claim 1, further comprising a display,
    wherein, in the prompting, the processor causes the display to display a message prompting the driver to switch the automatic steering mode to the manual steering mode.

8. The apparatus according to claim 7, further comprising a switch,
  wherein the processor further performs operations including:
    receiving a switching signal from the switch, when the switch is operated by the driver, and
    switching the automatic steering mode to the manual steering mode, when the switching signal is received after the message is displayed on the display.
9. The apparatus according to claim 8, wherein the processor further performs operations including:
  measuring a travelling period or a travelling distance from when the message is displayed on the display, and
  determining whether to stop the first vehicle based on the traveling period or the travelling distance, when the switching signal is not received.
10. An apparatus for a first vehicle, comprising:
  at least one of a camera or a radar provided on the first vehicle that detects within a sensing area around the first vehicle, the sensing area being detectable by the at least one of the camera or the radar,
  a processor that, when executing a program, performs operations including:
    receiving positional information from a wireless device mounted in a second vehicle outside the sensing area, the positional information including a current position of the second vehicle, a traveling direction of the second vehicle, and a traveling speed of the second vehicle;
    determining whether or not to switch an automatic steering mode to a manual steering mode on the basis of the positional information; and
    prompting a driver of the first vehicle to manually switch the automatic steering mode to the manual steering mode before the second vehicle enters the sensing area.
11. The apparatus according to claim 10, wherein, in the receiving, the processor further receives event information from the wireless device mounted in the second vehicle, and
  wherein, in the determining, the processor determines whether or not to switch the automatic steering mode to the manual steering mode on the basis of the event information.
12. The apparatus according to claim 10, wherein
  the processor further performs generating travelling schedule information of the first vehicle in the automatic steering mode on the basis of the positional information before it is determined whether or not to switch the automatic steering mode to the manual steering mode.
13. The apparatus according to claim 12, wherein the processor further performs operations including:
  transmitting, by broadcast, the generated travelling schedule information, and
  receiving a result, which indicates whether or not an other vehicle approves of the transmitted travelling schedule information.
14. The apparatus according to claim 13, wherein, in the determining, the processor further determines to switch the automatic steering mode to the manual steering mode when the received result indicates that the other vehicle does not approve of the travelling schedule information.
15. The apparatus according to claim 10, further comprising an I/O interface through which the processor receives the positional information.
16. The apparatus according to claim 10, further comprising a display,
  wherein, in the prompting, the processor causes the display to display a message prompting the driver to switch the automatic steering mode to the manual steering mode.
17. The apparatus according to claim 16, further comprising a switch,
  wherein the processor further performs operations including:
    receiving a switching signal from the switch, when the switch is operated by the driver, and
    switching the automatic steering mode to the manual steering mode, when the switching signal is received after the message is displayed on the display.
18. The apparatus according to claim 17, wherein the processor further performs operations including:
  measuring a travelling period or a travelling distance from when the message is displayed on the display, and
  determining whether to stop the first vehicle based on the traveling period or the travelling distance, when the switching signal is not received.

* * * * *